(12) United States Patent
Wang et al.

(10) Patent No.: US 11,425,760 B2
(45) Date of Patent: Aug. 23, 2022

(54) MULTI-ROOT PREAMBLE TECHNIQUES FOR WIRELESS COMMUNICATIONS SYSTEMS

(71) Applicant: QUALCOMM Incorporated, San Diego, CA (US)

(72) Inventors: Xiao Feng Wang, San Diego, CA (US); Iyab Issam Sakhnini, San Diego, CA (US); Peter Gaal, San Diego, CA (US); Huilin Xu, San Diego, CA (US); Jun Ma, San Diego, CA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/028,883

(22) Filed: Sep. 22, 2020

(65) Prior Publication Data

US 2021/0105825 A1 Apr. 8, 2021

Related U.S. Application Data

(60) Provisional application No. 62/911,071, filed on Oct. 4, 2019.

(51) Int. Cl.
*H04W 74/08* (2009.01)
*H04W 74/00* (2009.01)

(52) U.S. Cl.
CPC ..... *H04W 74/0833* (2013.01); *H04W 74/004* (2013.01); *H04W 74/006* (2013.01); *H04W 74/008* (2013.01)

(58) Field of Classification Search
CPC ............... H04J 13/102; H04L 27/2613; H04L 27/2636; H04L 27/2657; H04W 74/004;

(Continued)

(56) References Cited

U.S. PATENT DOCUMENTS 9,814,066 B2 * 11/2017 Bertrand ............. H04W 74/004
2008/0080472 A1 * 4/2008 Bertrand ............. H04J 13/0062
370/344

(Continued)

OTHER PUBLICATIONS

Huawei, et al., "Initial Access Signal and Channels in NR Unlicensed Band", 3GPP Draft; 3GPP TSG RAN WG1 Meeting #97, R1-1906041, 3rd Generation Partnership Project (3GPP), Mobile Competence Centre, 650, Route Des Lucioles, F-06921, Sophia-Antipolis Cedex, France, vol. RAN WG1, No. Reno, USA, 20190513-20190517, May 13, 2019 (May 13, 2019), XP051727498, 13 Pages, Retrieved from the Internet: URL: http://www.3gpp.org/ftp/Meetings%5F3GPP%5FSYNC/RAN1/Docs/R1%2D1906041%2Ezip, [retrieved on May 13, 2019], Section 3.2.

(Continued)

*Primary Examiner* — Liton Miah
(74) *Attorney, Agent, or Firm* — Holland & Hart LLP

(57) ABSTRACT

Methods, systems, and devices for wireless communications are described. A user equipment (UE) may communicate with a base station by initiating a random access procedure with a multi-root preamble. The UE may receive, from the base station, a configuration message that indicates one or more parameters for the multi-root preamble. The one or more parameters may include cyclic shifts, phase rotations, and sequence roots corresponding to a plurality of sequences. The base station may identify the one or more parameters and transmit the configuration message based on the identifying. The UE may identify the one or more parameters for the multi-root preamble based on the configuration message and/or a pre-configuration at the UE. The UE may transmit, to the base station, the multi-root preamble based at least in part on the one or more parameters.

34 Claims, 16 Drawing Sheets

(58) Field of Classification Search
CPC ............. H04W 74/006; H04W 74/008; H04W 74/0833
See application file for complete search history.

(56) References Cited

U.S. PATENT DOCUMENTS

| | | | | |
|---|---|---|---|---|
| 2013/0083753 | A1* | 4/2013 | Lee | H04L 1/0026 370/329 |
| 2016/0345365 | A1* | 11/2016 | Vujcic | H04W 74/0833 |
| 2017/0273115 | A1* | 9/2017 | Zhou | H04L 5/0091 |
| 2019/0053271 | A1* | 2/2019 | Islam | H04W 74/0833 |
| 2022/0022263 | A1* | 1/2022 | Zhang | H04L 27/2605 |

OTHER PUBLICATIONS

International Search Report and Written Opinion—PCT/US2020/052212—ISA/EPO—Jan. 11, 2021 (195321WO).

Mediatek Inc: "PRACH design for NTN scenario", 3GPP Draft; 3GPP TSG-RAN WG1 #98bis Meeting, R1-1909983, Prach Design Final, 3rd Generation Partnership Project (3GPP), Mobile Competence Centre; 650, Route Des Lucioles; F-06921 Sophia-Antipolis Cedex, France, vol. RAN WG1, No. Chongqing, China; 20191014-20191020, Oct. 4, 2019 (Oct. 4, 2019), XP051808061, 14 pages, Retrieved from the Internet: URL: https://ftp.3gpp.org/tsg_ran/WG1_RL1/TSGR1_98b/Docs/R1-1909983.zip R1-1909983 prach design final.docx, [retrieved on Oct. 4, 2019], Sections 2 and 4.

Qualcomm Incorporated: "Evaluations of 2-Rooted PRACH Preamble," 3GPP Draft, 3GPP TSG RAN WG1 #98bis, R1-1911113 Evaluations of 2-Rooted PRACH Preamble, 3rd Generation Partnership Project (3GPP), Mobile Competence Centre, 650, Route Des Lucioles, F-06921, Sophia-Antipolis Cedex, France, vol. RAN WG1, No. Chongqing, China; 20191014-20191020, Oct. 5, 2019 (Oct. 5, 2019), XP051789889, 9 pages, Retrieved from the Internet: URL: http://www.3gpp.org/ftp/tsg_ran/WG1_RL1/TSGR1_98b/Docs/R1-1911113.zip [retrieved on Oct. 5, 2019] Section 2.; figure 1.

Qualcomm Incorporated: "RACH Procedure and UL Timing Control for NTN", 3GPP Draft; 3GPP TSG RAN WG1 #97, R1-1909261, RACH Procedure and UL Timing Control for NTN, 3rd Generation Partnership Project (3GPP), Mobile Competence Centre; 650, Route Des Lucioles; F-06921 Sophia-Antipolis Cedex; FR, vol. RAN WG1, No. Prague, CZ; 20190826-20190830, Aug. 16, 2019 (Aug. 16, 2019), XP051765866, 9 Pages, Retrieved from the Internet: URL: http://www.3gpp.org/ftp/tsg_ran/WG1_RL1/TSGR1_98/Docs/R1-1909261.zip, [retrieved on Aug. 16, 2019], Section 2, figure 1.

Zhang C., et al., "Random Access Preamble Design for Large Frequency Shift in Satellite Communication," 2019 IEEE 2nd 5G World Forum (5GWF), IEEE, Sep. 30, 2019 (Sep. 30, 2019), pp. 659-664, XP033665212, DOI: 10.1109/5GWF.2019.8911614 [retrieved on Nov. 25, 2019] Section IV.

* cited by examiner

MULTI-ROOT PREAMBLE TECHNIQUES FOR WIRELESS COMMUNICATIONS SYSTEMS

CROSS REFERENCE

The present Application for Patent claims the benefit of U.S. Provisional Patent Application No. 62/911,071 by WANG et al., entitled "MULTI-ROOT PREAMBLE TECHNIQUES FOR WIRELESS COMMUNICATIONS SYSTEMS," filed Oct. 4, 2019, assigned to the assignee hereof, and expressly incorporated in its entirety by reference herein.

FIELD OF TECHNOLOGY

The following relates generally to wireless communications and more specifically to multi-root preamble techniques for wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A random access procedure between a UE and a base station may be initiated by the transmission of a random access channel (RACH) preamble by the UE to the base station. In some cases, there may be a large distance between the UE and the base station (e.g., the UE and the base station may be a part of a non-terrestrial network (NTN), among other examples). Because of the distance and/or relative motion of the UE and base station, there may be a long round-trip delay and frequency shift in message transmissions between the UE and the base station, which may not be supported by conventional wireless communications systems. Additionally, there may be a relatively high peak average power ratio (PAPR) associated with such systems, which may result in poor signal quality and inefficient communications.

SUMMARY

The described techniques relate to improved methods, systems, devices, and apparatuses that support multi-root preamble techniques for wireless communications systems. Generally, the described techniques provide for improved communications in wireless communications systems, such as a non-terrestrial network (NTN). For example, the described techniques enable a wireless device to transmit multiple sequences of a multi-root preamble using the same random access channel (RACH) occasion, which may conserve resources and result in more efficient resource utilization. Additionally or alternatively, the described techniques may enable a base station to determine one or more parameters associated with the multi-root preamble such that a signal metric (e.g., a peak average power ratio (PAPR)) is reduced, and signal the one or more preamble parameters to the wireless device. The wireless device may generate the multi-root preamble based at least in part on the one or more preamble parameters and achieve more efficient communications.

A method of wireless communications at a user equipment (UE) is described. The method may include receiving a configuration message that indicates one or more parameters for a multi-root random access preamble, the one or more parameters including a first sequence root, a second sequence root, and a first cyclic shift corresponding to a first sequence associated with the first sequence root, identifying a second cyclic shift corresponding to a second sequence associated with the second sequence root, and transmitting the multi-root random access preamble based on the one or more parameters.

An apparatus for wireless communications at a UE is described. The apparatus may include a processor, memory coupled with the processor, and instructions stored in the memory. The instructions may be executable by the processor to cause the apparatus to receive a configuration message that indicates one or more parameters for a multi-root random access preamble, the one or more parameters including a first sequence root, a second sequence root, and a first cyclic shift corresponding to a first sequence associated with the first sequence root, identify a second cyclic shift corresponding to a second sequence associated with the second sequence root, and transmit the multi-root random access preamble based on the one or more parameters.

Another apparatus for wireless communications at a UE is described. The apparatus may include means for receiving a configuration message that indicates one or more parameters for a multi-root random access preamble, the one or more parameters including a first sequence root, a second sequence root, and a first cyclic shift corresponding to a first sequence associated with the first sequence root, identifying a second cyclic shift corresponding to a second sequence associated with the second sequence root, and transmitting the multi-root random access preamble based on the one or more parameters.

A non-transitory computer-readable medium storing code for wireless communications at a UE is described. The code may include instructions executable by a processor to receive a configuration message that indicates one or more parameters for a multi-root random access preamble, the one or more parameters including a first sequence root, a second sequence root, and a first cyclic shift corresponding to a first sequence associated with the first sequence root, identify a second cyclic shift corresponding to a second sequence associated with the second sequence root, and transmit the multi-root random access preamble based on the one or more parameters.

In some examples of the method, apparatuses, and non-transitory computer-readable medium described herein, identifying the second cyclic shift further may include operations, features, means, or instructions for determining the second cyclic shift based on the configuration message.

In some examples of the method, apparatuses, and non-transitory computer-readable medium described herein, identifying the second cyclic shift further may include operations, features, means, or instructions for determining the second cyclic shift based on a configuration of the UE, a previous control message, or both.

In some examples of the method, apparatuses, and non-transitory computer-readable medium described herein, the one or more parameters further include a first phase rotation corresponding to the first sequence, a second phase rotation corresponding to the second sequence, or both.

In some examples of the method, apparatuses, and non-transitory computer-readable medium described herein, transmitting the multi-root random access preamble may include operations, features, means, or instructions for transmitting, to a base station, the first sequence in accordance with the one or more parameters and transmitting the second sequence in accordance with the one or more parameters.

In some examples of the method, apparatuses, and non-transitory computer-readable medium described herein, the first sequence and the second sequence may be Zadoff-Chu (ZC) sequences.

In some examples of the method, apparatuses, and non-transitory computer-readable medium described herein, transmitting the multi-root random access preamble may include operations, features, means, or instructions for transmitting the first sequence and the second sequence on the same RACH occasion.

In some examples of the method, apparatuses, and non-transitory computer-readable medium described herein, the multi-root random access preamble includes a set of sequences, the set of sequences including the first sequence and the second sequence.

A method of wireless communications at a base station is described. The method may include identifying, for a multi-root random access preamble, a first sequence root, a second sequence root, a first cyclic shift corresponding to a first sequence associated with the first sequence root, and a second cyclic shift corresponding to a second sequence associated with the second sequence root, transmitting a configuration message that indicates one or more parameters for the multi-root random access preamble, the one or more parameters including the first sequence root, the second sequence root, and the first cyclic shift, and receiving the multi-root random access preamble based on the one or more preamble parameters.

An apparatus for wireless communications at a base station is described. The apparatus may include a processor, memory coupled with the processor, and instructions stored in the memory. The instructions may be executable by the processor to cause the apparatus to identify, for a multi-root random access preamble, a first sequence root, a second sequence root, a first cyclic shift corresponding to a first sequence associated with the first sequence root, and a second cyclic shift corresponding to a second sequence associated with the second sequence root, transmit a configuration message that indicates one or more parameters for the multi-root random access preamble, the one or more parameters including the first sequence root, the second sequence root, and the first cyclic shift, and receive the multi-root random access preamble based on the one or more preamble parameters.

Another apparatus for wireless communications at a base station is described. The apparatus may include means for identifying, for a multi-root random access preamble, a first sequence root, a second sequence root, a first cyclic shift corresponding to a first sequence associated with the first sequence root, and a second cyclic shift corresponding to a second sequence associated with the second sequence root, transmitting a configuration message that indicates one or more parameters for the multi-root random access preamble, the one or more parameters including the first sequence root, the second sequence root, and the first cyclic shift, and receiving the multi-root random access preamble based on the one or more preamble parameters.

A non-transitory computer-readable medium storing code for wireless communications at a base station is described. The code may include instructions executable by a processor to identify, for a multi-root random access preamble, a first sequence root, a second sequence root, a first cyclic shift corresponding to a first sequence associated with the first sequence root, and a second cyclic shift corresponding to a second sequence associated with the second sequence root, transmit a configuration message that indicates one or more parameters for the multi-root random access preamble, the one or more parameters including the first sequence root, the second sequence root, and the first cyclic shift, and receive the multi-root random access preamble based on the one or more preamble parameters.

In some examples of the method, apparatuses, and non-transitory computer-readable medium described herein, the configuration message indicates the second cyclic shift.

Some examples of the method, apparatuses, and non-transitory computer-readable medium described herein may further include operations, features, means, or instructions for identifying, for the multi-root random access preamble, a first phase rotation corresponding to the first sequence and a second phase rotation corresponding to the second sequence, where the configuration message indicates the first phase rotation, the second phase rotation, or both.

Some examples of the method, apparatuses, and non-transitory computer-readable medium described herein may further include operations, features, means, or instructions for receiving, from a UE, the first sequence based on the one or more parameters and receiving the second sequence based on the one or more parameters.

Some examples of the method, apparatuses, and non-transitory computer-readable medium described herein may further include operations, features, means, or instructions for calculating a PAPR for a set of combinations of sequence roots and cyclic shifts, where the set of combinations includes at least a first combination of the first sequence root, the second sequence root, the first cyclic shift, and the second cyclic shift, and determining the first combination for the multi-root random access preamble based on the first combination having a minimum PAPR from the set of combinations.

In some examples of the method, apparatuses, and non-transitory computer-readable medium described herein, the base station may be a terrestrial base station or a non-terrestrial base station, the non-terrestrial base station including a satellite or a high altitude platform station in an NTN.

In some examples of the method, apparatuses, and non-transitory computer-readable medium described herein, the first sequence and the second sequence may be ZC sequences.

In some examples of the method, apparatuses, and non-transitory computer-readable medium described herein, receiving the multi-root random access preamble may include operations, features, means, or instructions for receiving the first sequence and the second sequence on the same RACH occasion.

In some examples of the method, apparatuses, and non-transitory computer-readable medium described herein, the multi-root random access preamble includes a set of sequences, the set of sequences including the first sequence and the second sequence.

A method of wireless communications at a UE is described. The method may include receiving a configuration message that indicates one or more parameters for a multi-root random access preamble, the one or more parameters including a first sequence root associated with a first sequence, a second sequence root associated with a second sequence, and a first phase rotation corresponding to the first sequence and transmitting the multi-root random access preamble based on the one or more parameters.

An apparatus for wireless communications at a UE is described. The apparatus may include a processor, memory coupled with the processor, and instructions stored in the memory. The instructions may be executable by the processor to cause the apparatus to receive a configuration message that indicates one or more parameters for a multi-root random access preamble, the one or more parameters including a first sequence root associated with a first sequence, a second sequence root associated with a second sequence, and a first phase rotation corresponding to the first sequence and transmit the multi-root random access preamble based on the one or more parameters.

Another apparatus for wireless communications at a UE is described. The apparatus may include means for receiving a configuration message that indicates one or more parameters for a multi-root random access preamble, the one or more parameters including a first sequence root associated with a first sequence, a second sequence root associated with a second sequence, and a first phase rotation corresponding to the first sequence and transmitting the multi-root random access preamble based on the one or more parameters.

A non-transitory computer-readable medium storing code for wireless communications at a UE is described. The code may include instructions executable by a processor to receive a configuration message that indicates one or more parameters for a multi-root random access preamble, the one or more parameters including a first sequence root associated with a first sequence, a second sequence root associated with a second sequence, and a first phase rotation corresponding to the first sequence and transmit the multi-root random access preamble based on the one or more parameters.

Some examples of the method, apparatuses, and non-transitory computer-readable medium described herein may further include operations, features, means, or instructions for determining a second phase rotation corresponding to the second sequence based on the configuration message.

Some examples of the method, apparatuses, and non-transitory computer-readable medium described herein may further include operations, features, means, or instructions for determining a second phase rotation corresponding to the second sequence relative to the first sequence based on a configuration of the UE, a previous control message, or both.

In some examples of the method, apparatuses, and non-transitory computer-readable medium described herein, the one or more parameters further include a first cyclic shift corresponding to the first sequence, a second cyclic shift corresponding to the second sequence, or both.

In some examples of the method, apparatuses, and non-transitory computer-readable medium described herein, transmitting the multi-root random access preamble may include operations, features, means, or instructions for transmitting, to a base station, the first sequence in accordance with the one or more parameters and transmitting the second sequence in accordance with the one or more parameters.

In some examples of the method, apparatuses, and non-transitory computer-readable medium described herein, the first sequence and the second sequence may be ZC sequences.

In some examples of the method, apparatuses, and non-transitory computer-readable medium described herein, transmitting the multi-root random access preamble may include operations, features, means, or instructions for transmitting the first sequence and the second sequence on the same RACH occasion.

In some examples of the method, apparatuses, and non-transitory computer-readable medium described herein, the multi-root random access preamble includes a plurality of sequences, the plurality of sequences including the first sequence and the second sequence.

A method of wireless communications at a base station is described. The method may include identifying, for a multi-root random access preamble, a first sequence root associated with a first sequence, a second sequence root associated with a second sequence, and a first phase rotation corresponding to the first sequence, transmitting a configuration message that indicates one or more parameters for the multi-root random access preamble, the one or more parameters including the first sequence root, the second sequence root, and the first phase rotation, and receiving the multi-root random access preamble based on the one or more preamble parameters.

An apparatus for wireless communications at a base station is described. The apparatus may include a processor, memory coupled with the processor, and instructions stored in the memory. The instructions may be executable by the processor to cause the apparatus to identify, for a multi-root random access preamble, a first sequence root associated with a first sequence, a second sequence root associated with a second sequence, and a first phase rotation corresponding to the first sequence, transmit a configuration message that indicates one or more parameters for the multi-root random access preamble, the one or more parameters including the first sequence root, the second sequence root, and the first phase rotation, and receive the multi-root random access preamble based on the one or more preamble parameters.

Another apparatus for wireless communications at a base station is described. The apparatus may include means for identifying, for a multi-root random access preamble, a first sequence root associated with a first sequence, a second sequence root associated with a second sequence, and a first phase rotation corresponding to the first sequence, transmitting a configuration message that indicates one or more parameters for the multi-root random access preamble, the one or more parameters including the first sequence root, the second sequence root, and the first phase rotation, and receiving the multi-root random access preamble based on the one or more preamble parameters.

A non-transitory computer-readable medium storing code for wireless communications at a base station is described. The code may include instructions executable by a processor to identify, for a multi-root random access preamble, a first sequence root associated with a first sequence, a second sequence root associated with a second sequence, and a first phase rotation corresponding to the first sequence, transmit a configuration message that indicates one or more parameters for the multi-root random access preamble, the one or more parameters including the first sequence root, the second sequence root, and the first phase rotation, and receive the multi-root random access preamble based on the one or more preamble parameters.

Some examples of the method, apparatuses, and non-transitory computer-readable medium described herein may further include operations, features, means, or instructions for identifying a second phase rotation corresponding to the second sequence.

Some examples of the method, apparatuses, and non-transitory computer-readable medium described herein may further include operations, features, means, or instructions for identifying, for the multi-root random access preamble, a first cyclic shift corresponding to the first sequence, a second cyclic shift corresponding to the second sequence, or both, where the configuration message indicates the first cyclic shift, the second cyclic shift, or both.

Some examples of the method, apparatuses, and non-transitory computer-readable medium described herein may further include operations, features, means, or instructions for receiving, from a UE, the first sequence based on the one or more parameters and receiving the second sequence based on the one or more parameters.

Some examples of the method, apparatuses, and non-transitory computer-readable medium described herein may further include operations, features, means, or instructions for calculating a PAPR for a set of combinations of sequence roots and phase rotations, where the set of combinations includes at least a first combination of the first sequence root, the second sequence root, the first phase rotation, and a second phase rotation corresponding to the second sequence, and determining the first combination for the multi-root random access preamble based on the first combination having a minimum PAPR from the set of combinations.

In some examples of the method, apparatuses, and non-transitory computer-readable medium described herein, the base station may be a terrestrial base station or a non-terrestrial base station, the non-terrestrial base station including a satellite or a high altitude platform station in an NTN.

In some examples of the method, apparatuses, and non-transitory computer-readable medium described herein, the first sequence and the second sequence may be ZC sequences.

In some examples of the method, apparatuses, and non-transitory computer-readable medium described herein, receiving the multi-root random access preamble may include operations, features, means, or instructions for receiving the first sequence and the second sequence on the same RACH occasion.

In some examples of the method, apparatuses, and non-transitory computer-readable medium described herein, the multi-root random access preamble includes a plurality of sequences, the plurality of sequences including the first sequence and the second sequence.

DETAILED DESCRIPTION

Figure 1:
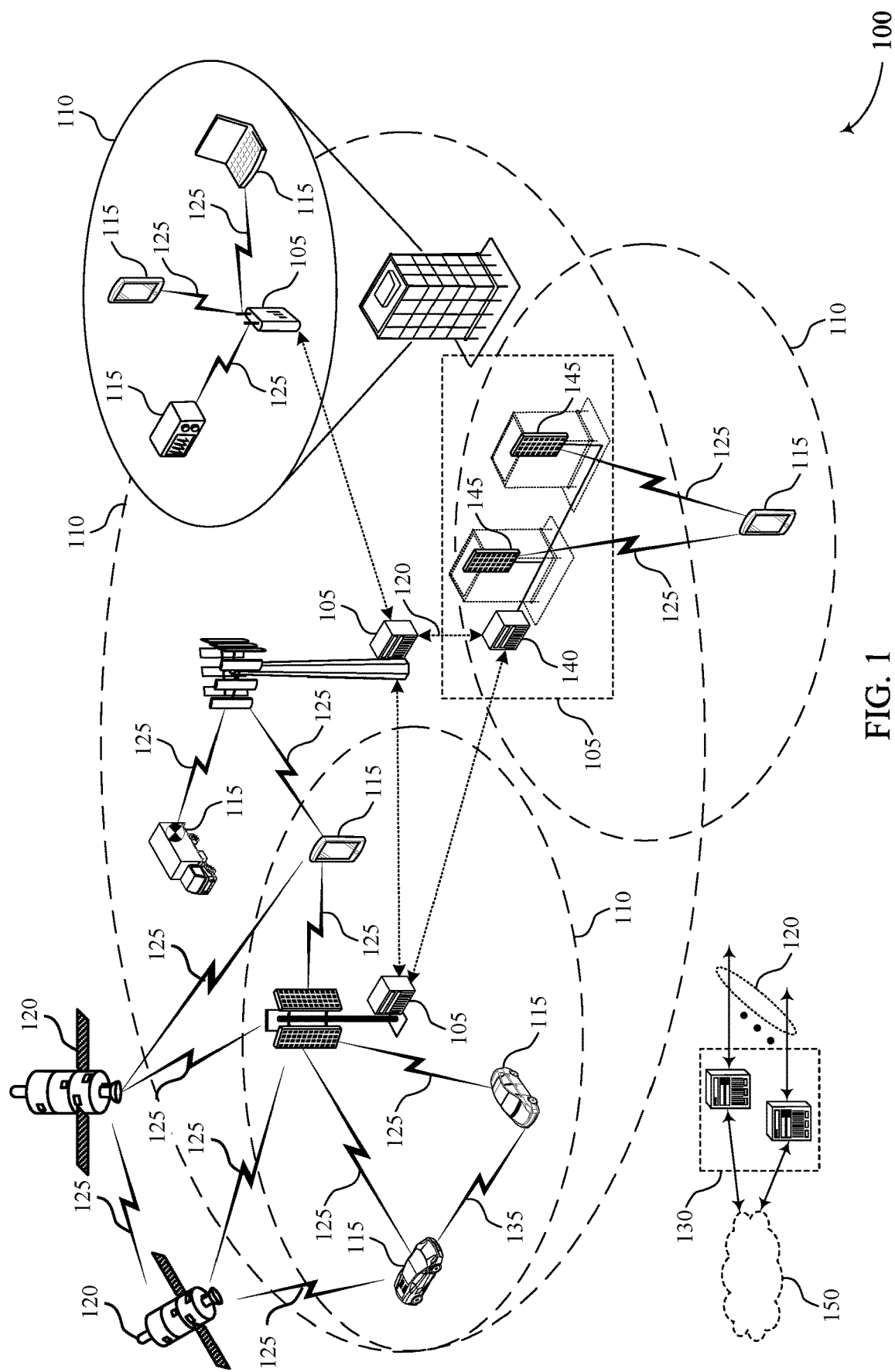
FIG. 1 illustrates an example of a system for wireless communications that supports multi-root preamble techniques for wireless communications systems in accordance with aspects of the present disclosure.

In some wireless communications systems, a user equipment (UE) may determine to connect to a new cell or base station based on a variety of communication parameters, movement of the UE, or the initiation of a handover procedure. In order to initiate communication with a new or different cell, the UE may transmit a random access channel (RACH) preamble to begin the random access procedure of connecting to a new cell. The transmission of the preamble may occur in a physical random access channel (PRACH), and the preamble may be transmitted as part of a multiple step random access process (e.g., a four-step RACH process or a two-step RACH process).

The random access process of a UE connecting to a cell may include multiple steps. In the example of a four-step RACH process, the UE may transmit a preamble message (e.g., PRACH Msg1) to a base station. The base station may transmit a preamble response (e.g., PRACH response Msg2) based on the received preamble. Based on receiving the preamble response, the UE may transmit a radio resource control (RRC) connection request (e.g., Msg3) to the base station. The base station may respond with an RRC connection setup message (e.g., Msg4). Each of these messages may be transmitted back and forth between a UE and a base station, which may enable the UE to connect to a new cell or base station.

In some cases, there may be a relatively long round-trip delay (RTD) and frequency shift in message transmissions between the UE and the base station, for example, in a non-terrestrial network (NTN). NTNs may involve the use of high altitude platform stations (HAPSs) and/or satellites to provide coverage for terrestrial base stations and UEs. For example, one or more satellites may be included in an NTN. Some satellites in an NTN may operate as base stations, and UEs may communicate directly with a serving satellite. In other cases, base stations or other satellites may relay transmissions between a serving satellite and a UE. Satellites may refer to vehicles operating in a variety of earth orbits, and in certain distances from the surface of the earth. For example, satellites may function in low-earth orbit (LEO), medium earth orbit (MEO) geostationary earth orbit (GEO), geosynchronous orbit (GSO), highly elliptical orbits (HEO), or another type of orbit. Each type of orbit may be defined for certain ranges of distances away from the surface of the earth. The distance between a UE and a serving satellite may be much greater than typical distances between a UE and a base station in a terrestrial network.

The distance, relative motion, and/or angle between the base station (e.g., a satellite) and the UE may lead to a round-trip delay (RTD) and/or a frequency shift that may negatively impact efficiency and communications functionality between the UE and the satellite. For example, the RTD and the frequency shift may impede the transmission timing of random access procedure transmissions. This may impact and interfere with transmissions to and from the satellite and the UE for the random access process and of other messages transmitted after the UE is connected to the cell. Further, the frequency shift caused by the Doppler effect associated with an NTN may impact accurate message reception and may lead to inaccurately decoded messages and inefficient transmissions. The techniques described herein may enable a wireless device such as a UE to transmit multiple sequences of a multi-root preamble, which may enable more reliable and efficient communications, for example, by enabling the network to detect large RTD and frequency shift. In order to conserve resources, in some cases the multiple sequences may be multiplexed and transmitted using the same RACH occasion. However, multiplexing and transmitting multiple sequences on the same RACH occasion may result in relatively poor signal quality (e.g., a relatively high peak average power ratio (PAPR)), which may in turn result in inefficient communications.

Accordingly, the described techniques may also enable a base station to determine one or more parameters associated with the multi-root preamble such that a signal metric is improved (e.g., a PAPR is reduced). The one or more parameters may include one or more sequences (e.g., Zadoff-Chu (ZC) sequences), roots associated with the sequences, cyclic shifts associated with the sequences, phase rotations associated with the sequences, or a combination thereof. As an example, the base station may perform a PAPR calculation for various combinations of the one or more parameters, and select a combination of parameters corresponding to a minimum PAPR. The base station may indicate the parameters of the selected combination to a wireless device such as a UE, for example, using control signaling such as a configuration message (e.g., via downlink control information (DCI), an RRC message such as a system information block (SIB), among other examples of control signaling). The UE may generate the multi-root preamble based at least in part on the one or more parameters, and thereby achieve more efficient communications (e.g., due to more efficient resource utilization by multiplexing the multiple sequences using the same RACH occasion) while ensuring reliable communications (e.g., due to improving the signal metric using the one or more parameters associated with the multi-root preamble).

Aspects of the disclosure are initially described in the context of wireless communications systems. Aspects of the disclosure are further described in relation to calculation schemes and process flows. Aspects of the disclosure are further illustrated by and described with reference to apparatus diagrams, system diagrams, and flowcharts that relate to multiple-root preamble techniques for wireless communications systems.

FIG. 1 illustrates an example of a wireless communications system 100 that supports multi-root preamble techniques for wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links (e.g., via an S1, N2, N3, or other interface). The base stations 105 may communicate with one another over the backhaul links (e.g., via an X2, Xn, or other interface) either directly (e.g., directly between base stations 105), or indirectly (e.g., via core network 130), or both. In some examples, the backhaul links may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 includes base stations 105, user terminals 115, satellites 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Wireless communications system 100 may also include one or more satellites 120. Satellite 120 may communicate with base stations 105 and user terminals 115 (such as UEs). Satellite 120 may be any suitable type of communication satellite configured to relay communications between different end nodes in a wireless communications system. Satellite 120 may be an example of a space satellite, a balloon, a dirigible, an airplane, a drone, an unmanned aerial vehicle, and/or the like. In some examples, the satellite 120 may be in a geosynchronous or geostationary earth orbit, a low earth orbit or a medium earth orbit. A satellite 120 may be a multi-beam satellite configured to provide service for multiple service beam coverage areas in a predefined geographical service area. The satellite 120 may be any distance away from the surface of the earth.

In some cases, a cell may be provided or established by a satellite 120 as part of a non-terrestrial network. A satellite 120 may, in some cases, perform the functions of a base station 105, act as a bent-pipe satellite, or may act as a regenerative satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a user terminal 115 or base station 105, or vice-versa.

UE 115 may communicate with satellites 120 and/or base stations 105 using communications links 125. For example, UEs 115 may utilize a random access procedure including a preamble transmission to obtain communication access with a satellite 120. The satellite 120 may orbit earth and communications between a UE 115 and a satellite 120 may be associated with a long RTD and a frequency shift. The UE 115 may generate and transmit a multi-root preamble for detection of the RTD and frequency shift. For example, the UE 115 may multiplex multiple sequences of the multi-root preamble on the same RACH occasion in order to conserve resources, and the UE 115 may receive control signaling from the satellite 120 indicating one or more preamble parameters (e.g., cyclic shifts, phase rotations, and/or roots of the sequences) corresponding to a reduced signal metric. The UE 115 may generate the multi-root preamble based on the one or more preamble parameters, which may result in improved communications as described herein. Although examples of techniques for reducing the PAPR of multi-root preamble messages are described in the context of an NTN, such techniques are also applicable to communications between the UE 115 and a base station 105 (or other terrestrial network communications).

Figure 2:
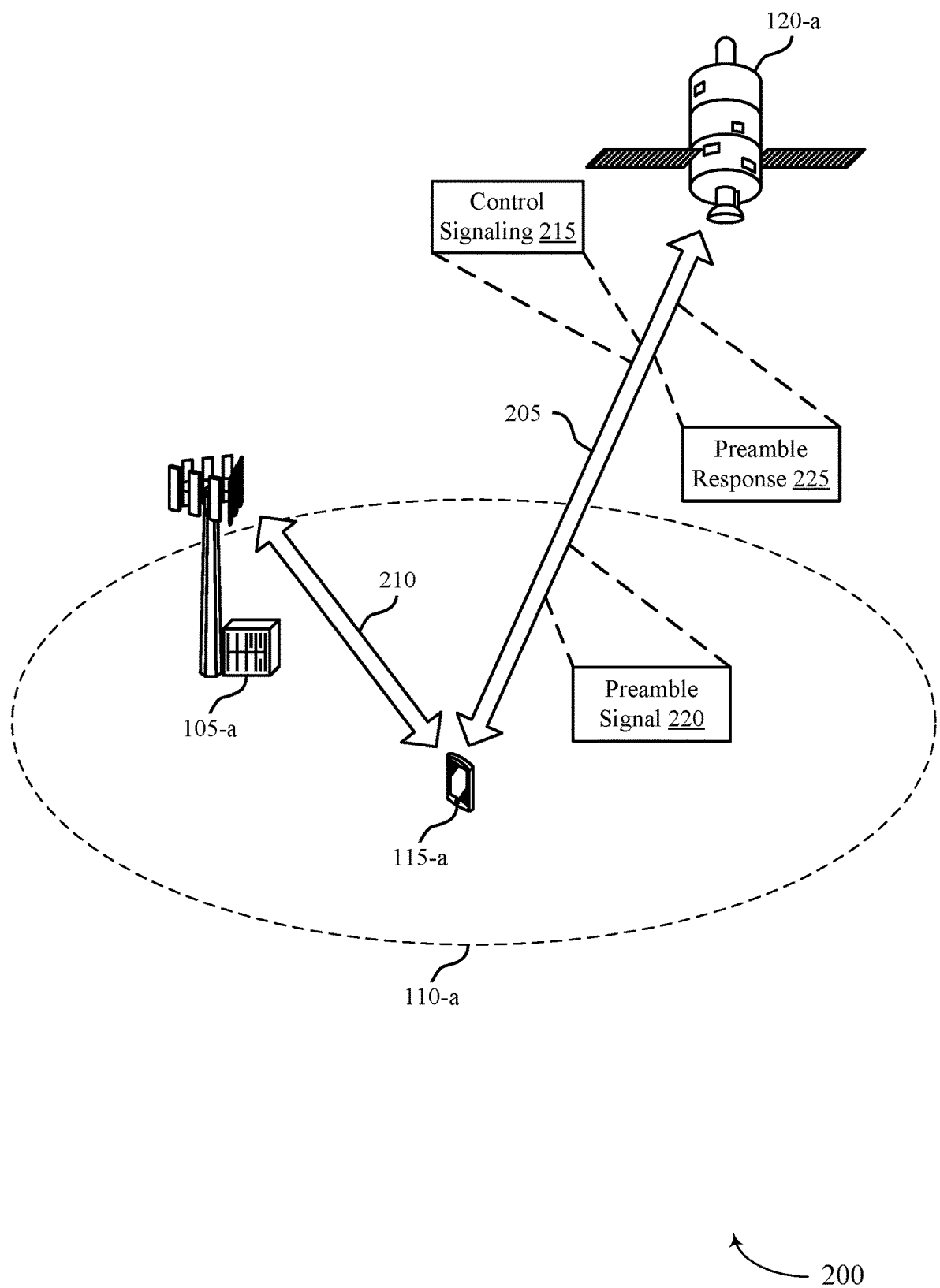
FIG. 2 illustrates an example of a wireless communications system that supports multiple-root preamble techniques for wireless communications systems in accordance with aspects of the present disclosure.

FIG. 2 illustrates an example of a wireless communications system 200 that supports multi-root preamble techniques for wireless communications systems in accordance with aspects of the present disclosure. In some examples, wireless communications system 200 may implement aspects of wireless communications system 100. Wireless communications system 200 may include a base station 105-a, a UE 115-a, and a satellite 120-a, which may be examples of a base station 105, UEs 115, and satellites 120 as described with reference to FIG. 1. The base station 105-a may serve a coverage area 110-a in cases of a terrestrial network, and the satellite 120-a may serve a coverage area 110-a in cases of an NTN. The UE 115-a may communicate with the satellite 120-a by transmitting signaling in a communication link 205 (e.g., a transmission channel), and the UE 115-a may communicate with the base station 105-a by transmitting signaling in another communication link 210 (or in the same communication link 205).

UEs 115 may communicate with base stations 105 and satellites 120 as part of wireless communications in an NTN. For example, the UE 115-a may communicate with the satellite 120-a over the communication link 205. In cases of a terrestrial network, the UE 115-a may communicate with the base station 105-a over the other communication link 210. In the case of NTN wireless communications, the satellite 120-a may be the serving base station for the UE 115-a.

The satellite 120-a may orbit the earth's surface at a particular altitude. The distance between the satellite 120-a and the UE 115-a may be much greater than the distance between the base station 105-a and the UE 115-a. The distance between the UE 115-a and the satellite 120-a may cause an increased RTD in communications between the UE 115-a and the satellite 120-a. Additionally or alternatively, a high relative speed and/or an angle between the satellite 120-a and the UE 115-a may result in a frequency shift in communications between the UE 115-a and the satellite 120-a. The frequency shift may be caused by the Doppler effect (e.g., due to the high relative speed between the satellite 120-a and the UE 115-a) and error related to the local oscillator of either the UE 115-a or the satellite 120-a. The RTD and frequency shift associated with communications in NTNs may lead to inefficiency in transmissions, latency, and inability to accurately transmit and receive messages.

The UE 115-a may determine to connect to the base station 105-a and/or the satellite 120-a using a random access procedure (e.g., a four-step RACH or a two-step RACH). For example, the initiation of the RACH procedure may begin with the transmission of a random access preamble 220 (e.g., NR PRACH) by the UE 115-a over communication link 205 to the satellite 120-*a*. The UE 115-*a* may transmit the random access preamble during one or more occasions in the PRACH (i.e., RACH occasions utilizing one or more resources for RACH messages). In some PRACH designs, there may be relatively poor estimation or accounting for the RTD or the frequency shift (e.g., when the RTD and/or the frequency shift are relatively large such as in NTNs).

In order to estimate relatively large RTDs and frequency shifts associated with communication with orbiting the satellite 120-*a* in an NTN, the UE 115-*a* may utilize a multi-root preamble (e.g., a two-root preamble) to initiate the random access procedure to connect to the satellite 120-*a*. As an example, a two-root preamble may include two ZC sequences. Each of the two ZC sequences may include different roots. A root may be labeled as $\mu_n$. The roots of the two ZC sequences, for example, may be defined as $\mu_0$ and $\mu_1$, where $\mu_0 \neq \mu_1$. The two-root preamble sequence length may be greater than the cyclic prefix (CP) (e.g., sequence length>cyclic prefix) and a guard period (GP) associated with the sequence may exceed the RTD. The CP, the GP, or both of the preamble may be configured to be greater than the RTD between the UE 115 and the satellite 120. Further, the sequence length multiplied by the sub-carrier spacing (SCS) of the communication channel between the UE 115 and the satellite 120 may configured to be greater than 2 times the maximum of the magnitude of the frequency shift. Thus, the sequence length of the two-root preamble sequence may satisfy the following equation:

$$\text{sequence}_{length} \times \text{SCS} > 2 \times \max|Fd| \quad (1)$$

where maxFd is the frequency shift caused by the relative speed and angle between the UE 115 and the satellite 120.

As an illustrative example, a preamble may have a sequence length of 839 (e.g., Len-839), and may operate in a system with an SCS of 1.25 kHz. This preamble sequence length may be plugged into Equation 1 as follows:

$$\pm 839 \times 1.25 > 2 \times \max Fd \quad (2)$$

Thus, the preamble sequence (Len-839) may mitigate frequency shifts for frequency shifts of up to ±524 kHz.

The selection of a particular preamble may occur based on the generation of the preamble set. In some cases, a particular radio access technology (RAT) may have a particular preamble set size P (e.g., P=64, P=139, etc.). Based on this set size P, P number of pairs of ZC roots denoted as $(\mu_{0j}, \mu_{1j})$ may be generated, such that j=0, 1, . . . , P−1. The pairs may further be generated such that $\mu_{0j} \neq \mu_{0j}'$, and $\mu_{1j} \neq \mu_{1j}'$, for j≠j'. In another example, for a preamble set size P, P pairs $(\mu_{0j}, \mu_{1j})$, j=0, 1, . . . , P−1 may be generated such that $\mu_{0j} \neq \mu_{0j}'$ or $\mu_{j1} \neq \mu_{1j}'$ for j≠j'. In this second case, there may be, in some instances, at most a number q pairs (e.g., q=2) with the same first root, and at most q pairs with the same second root.

The UE 115-*a* may randomly select a pair of ZC roots from the set of possible pairs of ZC roots. This set of possible pairs of ZC roots may be signaled to the UE 115-*a* in control signaling 215 (e.g., a configuration message) from the satellite 120-*a*. Based on selecting a pair of ZC roots, the UE 115-*a* may generate a full preamble sequence (e.g., including a CP). In some cases, a UE 115-*a* may generate a first preamble, a second preamble, or a subsequent preamble (e.g., up to 64 preambles in the case of 5G NR). The UE 115-*a* may select a pair of ZC root preamble sequences from the set of ZC root preamble sequences (e.g., advertised by the base station 105, or with which the UE 115-*a* is preconfigured, etc.) to generate two preamble sequences of a preamble. For example, the UE 115-*a* may be configured with a table including the set of ZC root preamble sequences (e.g., pre-configured at the UE 115-*a* or indicated by another device via a configuration message). The UE 115-*a* may select one or more ZC root preamble sequences from the table, for example, based on an indication of a ZC root preamble sequence, the UE 115-*a* may randomly select a ZC root preamble sequence, or a combination thereof, among other examples of parameters. As an illustrative example, the UE 115-*a* may be configured with tables including sets of various parameters as described herein (e.g., phase rotations, sequence roots, sequences, etc.). The UE 115-*a* may select parameters based on receiving a configuration message (e.g., the configuration message may indicate the parameters for selection, the configuration message may indicate a set of possible parameters for selection at the UE 115-*a*, or a combination thereof).

In some examples, the UE 115-*a* may also copy a portion of the end of one of the preamble sequences and place the copied portion at the beginning of another preamble sequence to generate the preamble, so that detection of the preamble by the base station or satellite may overlap with the end of the CP and still detect the entire preamble sequence.

The UE 115-*a* may transmit the multi-root preamble signal 220 to a base station to initiate a random access procedure. The base station may be the satellite 120-*a*, the base station 105-*a*, or a combination thereof. In some examples, the satellite 120-*a* may be transparent. For example, the base station 105-*a* may perform some or all of the operations described herein (e.g., the base station 105-*a* may perform the PRACH processing). In some other examples, the satellite 120-*a* may be regenerative. For example, the satellite 120-*a* may be the base station and some or all of the operations described herein may be performed at the satellite 120-*a* (e.g., the satellite 120-*a* may perform the PRACH processing).

The base station (e.g., the satellite 120-*a* or the base station 105-*a*) may receive the preamble signal, and may determine (i.e., estimate) the RTD and Doppler shift based on the preamble signal 220. For example, the base station may detect the preamble signal 220 (e.g., the base station may cut a fast fourier transform (FFT) window to detect the separate sequences of the preamble in one or more OFDM symbols). The base station may detect the selected ZC roots for the sequences of the multi-root preamble (e.g., roots $\mu_0$ and $\mu_1$ for two sequences in a two-root preamble) based on, as an example, whether a correlation peak of an FFT window (e.g., due to the orthogonality of the preamble sequences) is detected. That is, the base station may determine that an amplitude output of a correlation process is not detected and thus determine that a root was not detected, and repeat such correlation processes until a correlation peak has been identified.

Based on detecting the roots of the multi-root preamble sequences, the base station may estimate the RTD and the frequency shift associated with communications with the UE 115-*a*. For example, in a system where there may be q number of same roots $\mu_n$, there may be q possible peak locations retained by the base station. However, the detection of the roots may remain unambiguous regardless of the number of possible peak locations.

In some examples, the base station may assume that q=1. In this case, a number of assumptions may be included in the estimation of the RTD and frequency shift. These assumptions may include that peak locations are integer multiples of samples, where the samples may be denoted by $b_0$, $b_1$. The assumptions may also include that the RTD is measured in integer numbers of samples, that the Doppler shift is measured in an integer multiple of SCS, and that roots $\mu_0$ and $\mu_1$ have inverse roots $\mu_0^{-1}$, and $\mu_1^{-1}$ (e.g., modular multiplicative inverses of the roots $\mu_0$ and $\mu_1$). Based on these assumptions, two equations can be solved in order to calculate RTD (denoted as delay in Equation 3) and frequency shift (denoted as doppler in Equation 3).

$$\text{delay} + \text{doppler} \times \mu_n^{-1} \equiv b_n (\bmod L) \tag{3}$$

Satellite 120 may solve equation 3 for each root $\mu_0$ and $\mu_1$. In some situations, the range of delay may be less than L and the range of doppler may be less than 0.5 L*SCS. In such cases, Equation 3 and Equation 4 in the following solution may uniquely identify delay and doppler. The solution equation for RTD is as follows:

$$\text{doppler} \equiv (\mu_0^{-1} - \mu_1^{-1})^{-1} \times (b_0 - b_1)(\bmod L) \tag{4}$$

The solution equation for frequency shift is as follows:

$$\text{delay} \equiv b_0 - (1 - \mu_0 \mu_1^{-1})^{-1} \times (b_0 - b_1)(\bmod L) \tag{5}$$

In cases where the range of delay is less than the sequence length L of the preamble, and the range of Doppler is less than 0.5 L*SCS, equations 4 and 5 may uniquely identify the RTD and the Doppler shift caused by the distance between the UE 115 transmitting the preamble and the satellite 120 (or base station 105 in cases of a terrestrial network) that receives and demodulates the preamble.

Alternatively or additionally, q may be greater than 1. In this cases, there may be at most $q^2$ peak location pairs for $\mu_0$ and $\mu_1$. In this case, $q^2-1$ pairs may be removed from the list of potential pairs. In one example, delay and Doppler may be solved separately for each root pair possibility. In this example, impossible values of delay and Doppler may be removed. These impossible values may be removed if there is a prior indication of the range of delay and Doppler, so that values outside of the range may be removed. Further, P pairs of $(\mu_0, \mu_1)$ may be selected judiciously such that peak location pairs may be removed accordingly.

Thus, a base station (e.g., a satellite 120-a or a base station 105-a) may jointly detect the preamble transmitted by a UE 115-a and also estimate the RTD and frequency shift (e.g., Doppler effect) caused by the distance, relative motion, angle, or a combination thereof between the UE 115-a and the base station. For example, with 120 kHz SCS, the preamble transmission and RACH process may withstand relatively high Doppler shifts (e.g., Doppler shifts of up to ±500 kHz), and the CP may be long enough to cover the maximum delay differential.

The estimation of RTD and Doppler shift may depend on the location of the detected peaks. This may lead to potential error in estimations found by Equations 4 and 5. The error may occur in number of samples $b_0$ and $b_1$. The error in these samples is scaled by $(\mu_0^{-1} - \mu_1^{-1})^{-1}$ as shown in Equations 4 and 5. Thus, error may be decreased by the UE 115 selecting root pairs $\mu_0$ and $\mu_1$ such that $(\mu_0^{-1} - \mu_1^{-1})^{-1} \equiv 1 \pmod{L}$ or is small (e.g., less than or equal to a threshold), so that any potential error in $b_0$ and $b_1$ may not be scaled by a factor greater than 1. In some cases, the base station may transmit an indication of the estimated delay and Doppler effect to the UE 115-a.

In some examples, the UE 115-a may use a first modulation scheme for modulating and transmitting the sequences of a multi-root preamble. The sequences corresponding to each ZC root may be modulated into different OFDM symbols. For example, a first sequence (e.g., with a corresponding first CP) may correspond to one ZC root pair of two ZC root pairs selected for the preamble. The first sequence may be modulated into one OFDM symbol. A second sequence (e.g., with a corresponding second CP) may correspond to another ZC root pair of the two ZC root pairs selected for the preamble and may be modulated into a second OFDM symbol. As an example, the two OFDM symbols may be concatenated back to back including the corresponding CPs. Thus, the full RACH preamble may include sequentially the first sequence in the first OFDM symbol followed by the second sequence in the second OFDM symbol. In some cases, the generated preamble may be offset from another preamble by a GP (e.g., a GP less than or equal to the RTD of the communications between the UE 115 and the satellite 120 (or base station 105). In some examples, the end of a first preamble and the end of a second preamble may also be separated by a GP (e.g., a GP less than or equal to the RTD). Such a preamble scheme may be extended, in some cases, to any number of sequences for a preamble or any number of preambles.

In some other examples, the UE 115-a may use a second modulation scheme for modulating and transmitting the sequences of a multi-root preamble. The sequences corresponding to each ZC root may be modulated into the same OFDM symbol (e.g., with one leading CP). In such a preamble modulation scheme, a first sequence of a preamble may correspond to a first ZC root and a second sequence of the preamble may correspond to a second ZC root (e.g., with a two-root preamble). The two sequences may be DFT-transformed onto the same or different frequency bands (e.g., on adjacent or non-adjacent sub-carriers), and then modulated into a single OFDM symbol. The generation of such a preamble may include a CP added to the beginning of the OFDM symbol. Such a preamble scheme may be extended, in some cases, to any number of sequences for a preamble or any number of preambles. Additionally, modulating the sequences into one OFDM symbol may realize more efficient communications, such as enhanced resource utilization (e.g., using less resources), but may also result in a relatively reduced signal quality, such as a high PAPR.

Accordingly, the techniques described herein may enable the base station (e.g., the base station 105-a and/or the satellite 120-a) to determine one or more parameters associated with the multi-root preamble such that a signal metric is improved (e.g., the PAPR is reduced). The one or more parameters may include one or more of the described ZC sequences, roots associated with the ZC sequences, cyclic shifts associated with the ZC sequences, phase rotations associated with the ZC sequences, or a combination thereof. For example, the base station may perform a PAPR calculation as described herein for various combinations of the parameters. The base station may compare various combination of parameters and select a combination of parameters (e.g., corresponding to a minimum PAPR) for signaling to the UE 115-a. The base station may indicate the parameters of the selected combination to the UE 115-a, for example, using control signaling such as a configuration message (e.g., via downlink control information (DCI), system information, among other examples) or the UE 115-a may be configured with some of the parameters (e.g., the parameter is pre-specified and known to the UE 115-a). The UE 115-a may generate the multi-root preamble as described above based at least in part on the one or more parameters.

For example, the network may configure two sequences of a two-root preamble with parameters including roots (e.g., roots $\mu_0$ and $\mu_1$), cyclic shifts, and phase rotations corresponding to each of the two sequences. The cyclic shifts may include a first cyclic shift corresponding to a first sequence and a second cyclic shift corresponding to a second sequence. The cyclic shifts may be the same or different for each sequence (e.g., in some examples using different cyclic shifts for each sequence may reduce the PAPR). Additionally or alternatively, the phase rotations may include a first phase rotation corresponding to the first sequence, the second sequence, or both, and/or a second phase rotation corresponding to the first sequence, the second sequence, or both.

In some examples, the network (e.g., the base station 105-a and/or the satellite 120-a) may signal some of the parameters to the UE 115-a via control signaling 215. For example, the base station may send or otherwise advertise a configuration message to the UE 115-a. In some examples, the configuration message may indicate the roots corresponding to each of the sequences (e.g., roots $\mu_0$ and $\mu_1$). The configuration message may also indicate the cyclic shifts corresponding to each of the sequences (e.g., the first cyclic shift and the second cyclic shift). In some other examples, the configuration message may indicate a portion of the cyclic shifts (e.g., the first cyclic shift) when another portion (e.g., the second cyclic shift) is configured at the UE 115-a (e.g., pre-specified and known to the UE 115-a), which may result in more efficient communications due to a reduced size of the configuration message. Additionally or alternatively, the configuration message may indicate one or more phase rotations corresponding to one or more sequences. For example, a phase rotation may be configured or defined to a first sequence and/or a second sequence of a two-root preamble. In such examples, sequences associated with a phase rotation may be multiplied by exp (jØ) before transmission, where the phase rotation is denoted as Ø. In some examples, a phase rotation of the parameters may be relative to one or more sequences. For example, a phase rotation (e.g., a first phase rotation) may indicate a phase rotation of a first sequence relative to a second sequence, or the second sequence relative to the first sequence, or both. In some cases (e.g., if no phase rotation is signaled), a UE 115-a may determine a relative phase rotation to minimize the PAPR (e.g., the UE 115-a may locally select a phase rotation). The techniques described herein may also be applied to more than two sequences (e.g., for a multi-root preamble with more than two roots) and/or more than two preambles.

The UE 115-a may generate a multi-root preamble based at least in part on the indicated and/or configured parameters, and thereby achieve more efficient communications (e.g., due to more efficient resource utilization by multiplexing the multiple sequences using the same RACH occasion) while ensuring reliable communications (e.g., due to improving the signal metric using the one or more parameters associated with the multi-root preamble). The UE 115-a may transmit the multi-root preamble to the base station. The base station may transmit a preamble response 225 to the UE 115-a to continue the random access procedure between the UE 115-a and the base station.

In some cases, the UE 115-a may transmit a multi-root preamble over the other communication link 210 to a terrestrial the base station 105-a to initiate a random access procedure with the base station 105-a, in addition to or rather than with a non-terrestrial satellite 120-a. This may include the base station 105-a identifying the various parameters described herein (e.g., via signal calculations with reference to FIG. 3) and/or determining the RTD and Doppler shift based on the multi-root preamble received from the UE 115-a. The base station 105-a may then transmit a preamble response to the UE 115-a to continue the RACH process.

Figure 3:
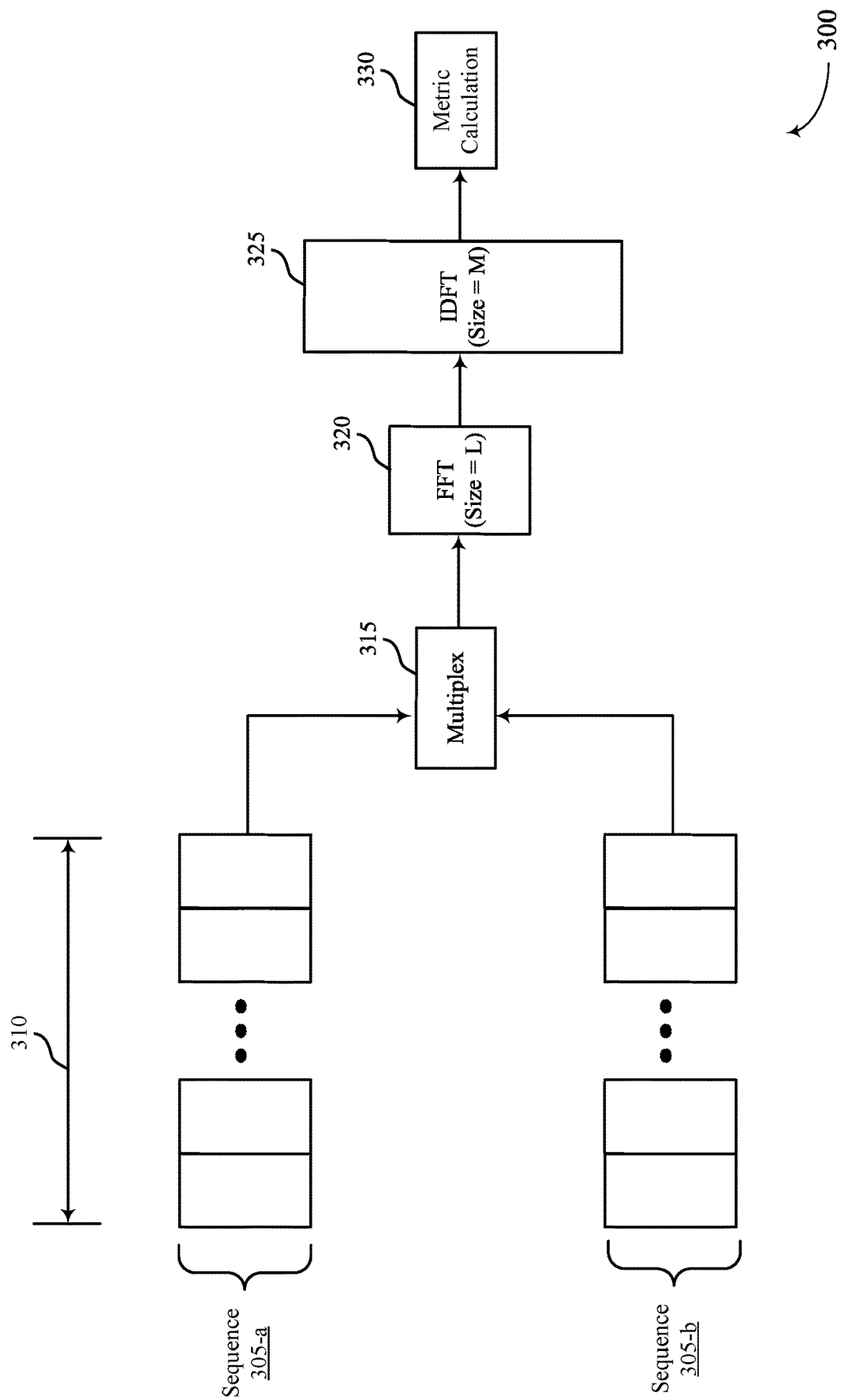
FIG. 3 illustrates an example of a calculation scheme in accordance with aspects of the present disclosure.

FIG. 3 illustrates an example of a calculation scheme 300 that supports multiple-root preamble techniques for wireless communications systems in accordance with aspects of the present disclosure. In some examples, the calculation scheme 300 may implement aspects of wireless communications system 100 and 200. As an example, a network device (e.g., the base station 105-a or the satellite 120-a) may implement the calculation scheme 300 to determine one or more preamble parameters for generation of a preamble as described with reference to FIG. 2. The calculation scheme 300 may illustrate a calculation process for determining a signal metric (e.g., PAPR) for various combinations of parameters for a two-root preamble with two ZC sequences, but it may be understood that the calculations shown in the calculation scheme 300 may similarly be performed for other multi-root preambles with other numbers of ZC sequences (or other types of sequences such as Gold sequences).

The calculation scheme 300 may include a sequence 305-a and a sequence 305-b. The sequences 305 may be examples of the ZC sequences described with reference to FIG. 2. For example, the sequence 305-a and/or the sequence 305-b may have a sequence length 310 (e.g., a sequence length 310 greater than a CP associated with a sequence 305 as described with reference to FIG. 2). The sequence 305-a and the sequence 305-b may be sequences to be included in a two-root preamble message (e.g., transmitted from a UE 115 to a satellite 120).

The calculation scheme 300 may also include a multiplexing step at 315. For example, the sequence 305-a and the sequence 305-b may be modulated into a symbol (e.g., an OFDM symbol associated with a RACH occasion) at 315. An FFT process may be performed on the multiplexed sequences 305 at 320, which may result in a multiplexed signal with a size of L (e.g., the length of the sequences 305, such as L=139). Further processing may be performed at 325, for example, an inverse discrete fourier transform (IDFT) process may be performed on the multiplexed signal resulting in an OFDM symbol with a size M (e.g., the length of each symbol of a preamble, such as M=24576).

At 330, the calculation scheme 300 may include a metric calculation. For example, using a set of input parameters (i.e., a combination of one or more parameters) as discussed herein, at 330 a device may calculate a PAPR corresponding to a multi-root preamble message generated using the set of input parameters.

A network device (e.g., a base station 105 or a satellite 120) may implement the calculation scheme 300 to calculate a signal metric for various combinations of parameters (e.g., various sets of input parameters) associated with the sequences 305. For example, a satellite 120 may use the calculation scheme 300 as one example of a transmitter design to determine a PAPR resulting from a combination of sequences 305 and parameters. The parameters may include roots corresponding to the sequences 305 (e.g., roots $\mu_0$ and $\mu_1$), cyclic shifts corresponding to the sequences 305 (i.e., a $CS_1$ corresponding to the sequence 305-a and a $CS_2$ corresponding to the sequence 305-b), phase rotations corresponding to one or more of the sequences 305, or any combination thereof. The satellite 120 may select a combination of sequences and parameters resulting in a lower (e.g., a minimum) PAPR than other combinations of sequences 305 and parameters.

In some examples, one or more PAPR distributions may be calculated for a sequence length 310 (e.g., a sequence length L may be assumed as, for example, L=139) and a symbol length (e.g., a symbol length M may be assumed to be, for example, M=24567). For example, a first PAPR distribution may be calculated using a single sequence preamble (e.g., using sequence 305-*a* with an associated root $\mu_1=1, 2, \ldots, L-1$). Additionally or alternatively, a second PAPR distribution may be calculated using multiple sequences 305, for example, the sequence 305-*a* and the sequence 305-*b*. In some examples, the roots of the sequences 305 may be conjugates of each other. For example, a root associated with the sequence 305-*a* may be represented as $\mu_1=1, 2, \ldots, L-1$ and a root associated with the sequence 305-*b* may be represented as root $\mu_2=L-\mu_1$. Additionally or alternatively, a third PAPR distribution may be calculated. The third PAPR distribution may include multiple sequences 305 (e.g., the sequence 305-*a* and the sequence 305-*b*) when varying possible combinations of the roots of each sequence 305 (e.g., various combinations of $\{\mu_1,\mu_2\}$ where $\mu_1$ and $\mu_2 \in \{1, 2, \ldots, L-1\}$).

In some examples, the calculation scheme 300 may vary cyclic shifts associated with each sequence 305 to determine cyclic shifts to signal to the UE 115-*a* to use for generating a PRACH preamble such that a signal metric (e.g., a PAPR of the multi-root preamble) is improved. As an illustrative example, the calculation scheme 300 may compare a first PAPR using the same cyclic shift for each sequence 305 (e.g., a cyclic shift of zero for both the sequence 305-*a* and the sequence 305-*b*) with a second PAPR using different cyclic shifts for one or more of the sequences 305. For example, the second PAPR may be calculated using a cyclic shift of zero for the sequence 305-*a* and a different value for the cyclic shift for the sequence 305-*b* chosen out of possible values of the cyclic shift in conjunction with possible combinations of the possible root values (e.g., for the second and third PAPR distributions using multiple roots and sequences 305). The calculation scheme 300 may determine that the second PAPR is less than a threshold or smaller when compared to the first PAPR and select the cyclic shifts and roots corresponding to the second PAPR result for indication to a UE 115. Such a process may be repeated for a set of possible combinations of cyclic shifts, roots, and sequences.

Additionally or alternatively, such a process may implement other parameters, such as a phase rotation. For example, the calculation scheme 300 may vary possible phase rotations associated with one or more sequences 305 to determine phase rotations to configure the UE 115 to use for generating a PRACH preamble such that a signal metric (e.g., a PAPR of the multi-root preamble) is improved. That is, the calculation scheme 300 may include determining a PAPR associated with utilizing varying phase rotations for one or both of the sequence 305-*a* and the sequence 305-*b*. The calculation scheme 300 may include selecting the phase rotations corresponding to the lowest PAPR, in some examples, in combination with other parameters corresponding to the lower PAPR, such as cyclic shifts and/or roots for each sequence 305.

A base station 105 and/or a satellite 120 may use the results of the calculation scheme 300 to configure the UE 115 with a set of parameters corresponding to the lowest PAPR as described with reference to FIG. 2. For example, the satellite 120 or the base station 105 may signal one or both roots for the sequence 305-*a* and the sequence 305-*b*, and the UE 115 may generate a RACH preamble message based on the signaled roots. In some examples, the satellite 120 or the base station 105 may also signal one or both cyclic shifts associated with the sequence 305-*a* and the sequence 305-*b*, and the UE 115 may generate the RACH preamble based on the cyclic shifts (e.g., the signaled cyclic shifts and/or preconfigured cyclic shifts). In some examples, the satellite 120 or the base station 105 may also signal one or more phase rotations for the sequence 305-*a*, the sequence 305-*b*, or both, and the UE 115 may generate a RACH preamble message based on the signaled one or more phase rotations.

Figure 4:
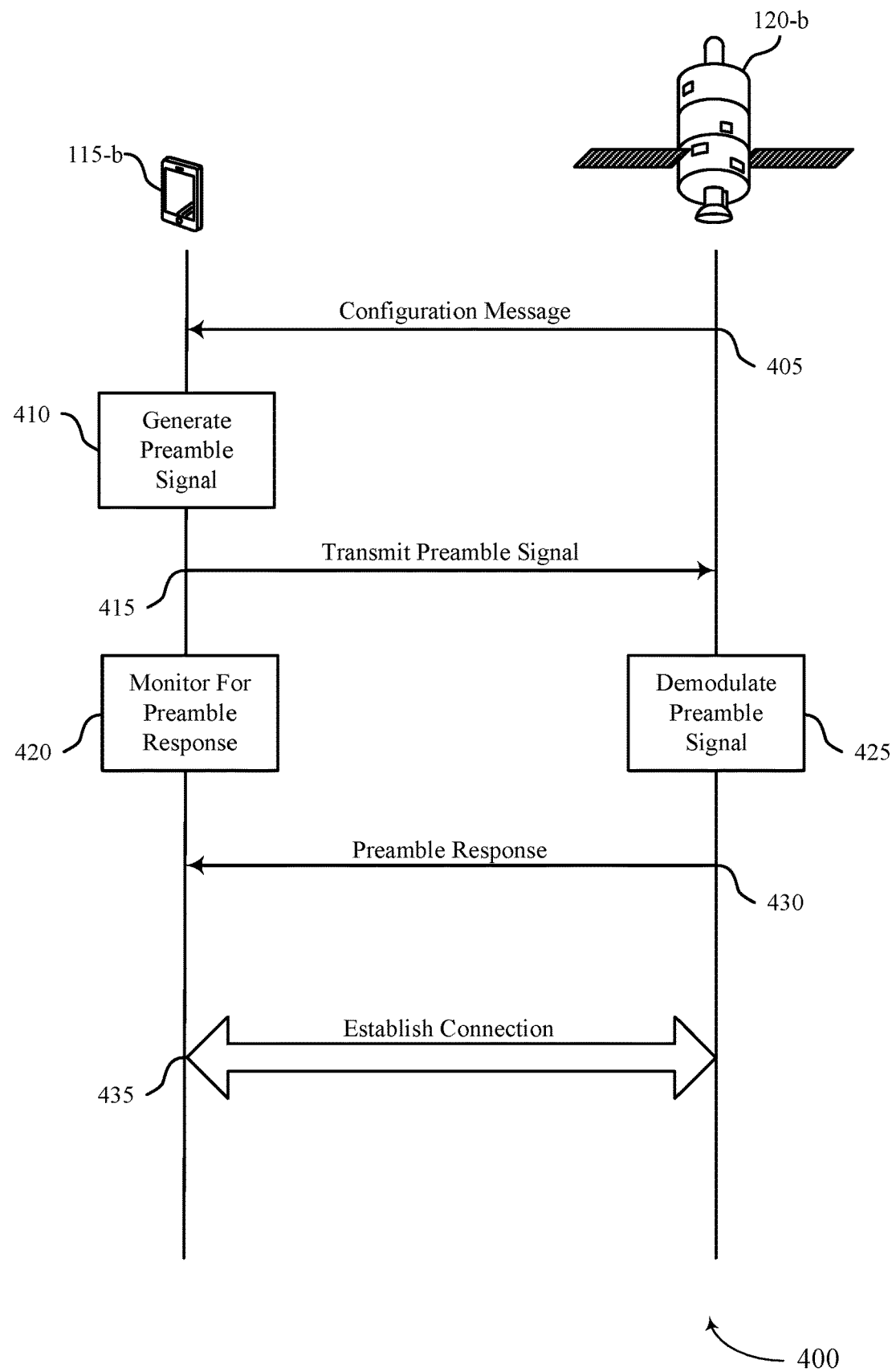
FIG. 4 illustrates an example of a process flow that supports multiple-root preamble techniques for wireless communications systems in accordance with aspects of the present disclosure.

FIG. 4 illustrates an example of a process flow 400 that supports multiple-root preamble techniques for wireless communications systems in accordance with aspects of the present disclosure. In some examples, process flow 400 may implement aspects of wireless communications systems 100 and 200 and calculation scheme 300. The process flow 400 may illustrate an example of multi-root preamble generation and transmission by a UE 115. UE 115-*b* may be an example of UEs 115 as described with reference to FIGS. 1 through 3. Satellite 120-*b* may be an example of Satellites 120 as described with reference to FIGS. 1 through 3. Satellite 120-*b* may be an example of a non-terrestrial base station. In some cases, Satellite 120-*b* may instead be a base station 105 in a terrestrial network, or the operations described herein may be performed by a combination of the satellite 120-*b* and the base station 105. Alternative examples of the following may be implemented, where some steps are performed in a different order than described or are not performed at all. In some cases, steps may include additional features not mentioned below, or further steps may be added.

At 405, the satellite 120-*b* may transmit a configuration message (e.g., via control signaling such as DCI, an RRC message, an SIB, among other examples of control signaling). The configuration message may indicate one or more parameters associated with a preamble message. For example, the configuration message may indicate one or more cyclic shifts, phase rotations, ZC roots, and/or sequences as described herein with reference to FIGS. 1 through 3. In some examples, the satellite 120-*b* may determine the parameters to indicate in the configuration message based on one or more metric calculations, such as PAPR calculations described with reference to FIG. 3. The UE 115-*b* may receive the configuration message indicating the parameters at 405 (e.g., via a blind decoding procedure on one or more DCI candidates of a control channel, among other examples).

At 410, the UE 115-*b* may generate a preamble signal (e.g., a multi-root preamble signal) as described with reference to FIGS. 1 through 3. The generation of the preamble signal may include generating a set of preamble sequence pairs based on the parameters indicated in the configuration message (e.g., a set of sequences, roots, cyclic shifts, phase rotations, or a combination of these parameters). For example, preamble signal may be generated in accordance with an indicated or pre-configured cyclic shift, root, and/or phase rotation for each sequence of the preamble message. In some examples, the sequences may me multiplexed on the same OFDM symbol (i.e., RACH occasion).

At 415, the UE 115-*b* may transmit the preamble signal that is generated at 410. In some examples, the UE 115-*b* may transmit the preamble signal over an OFDM symbol including the multiplexed sequences (e.g., when the sequences share the same RACH occasion). Each of the first preamble sequences may be examples of ZC sequences.

At 415, satellite 120-*b* may receive the transmitted preamble signal that is generated based on the parameters described herein. The reception of the preamble signal may include receiving the preamble signal over a symbol period (e.g., corresponding to an OFDM symbol including one or more multiplexed sequences).

At 420, UE 115-*b* may monitor for a preamble response based on the preamble signal. In some cases, the UE 115-*b* may transmit a second preamble signal based on determining that the preamble response has not been received at the satellite 120-*b*. At 425, the satellite 120-*b* may demodulate the received preamble signal. This may include identifying the multiple root preamble sequences as described herein with reference to FIG. 2. In some examples, the Satellite 120-*b* may identify a doppler shift, a delay, or both, based on identifying the sequences and may use the identified doppler shift and/or delay for demodulating subsequent transmissions received from the UE 115-*b*.

Figure 5:
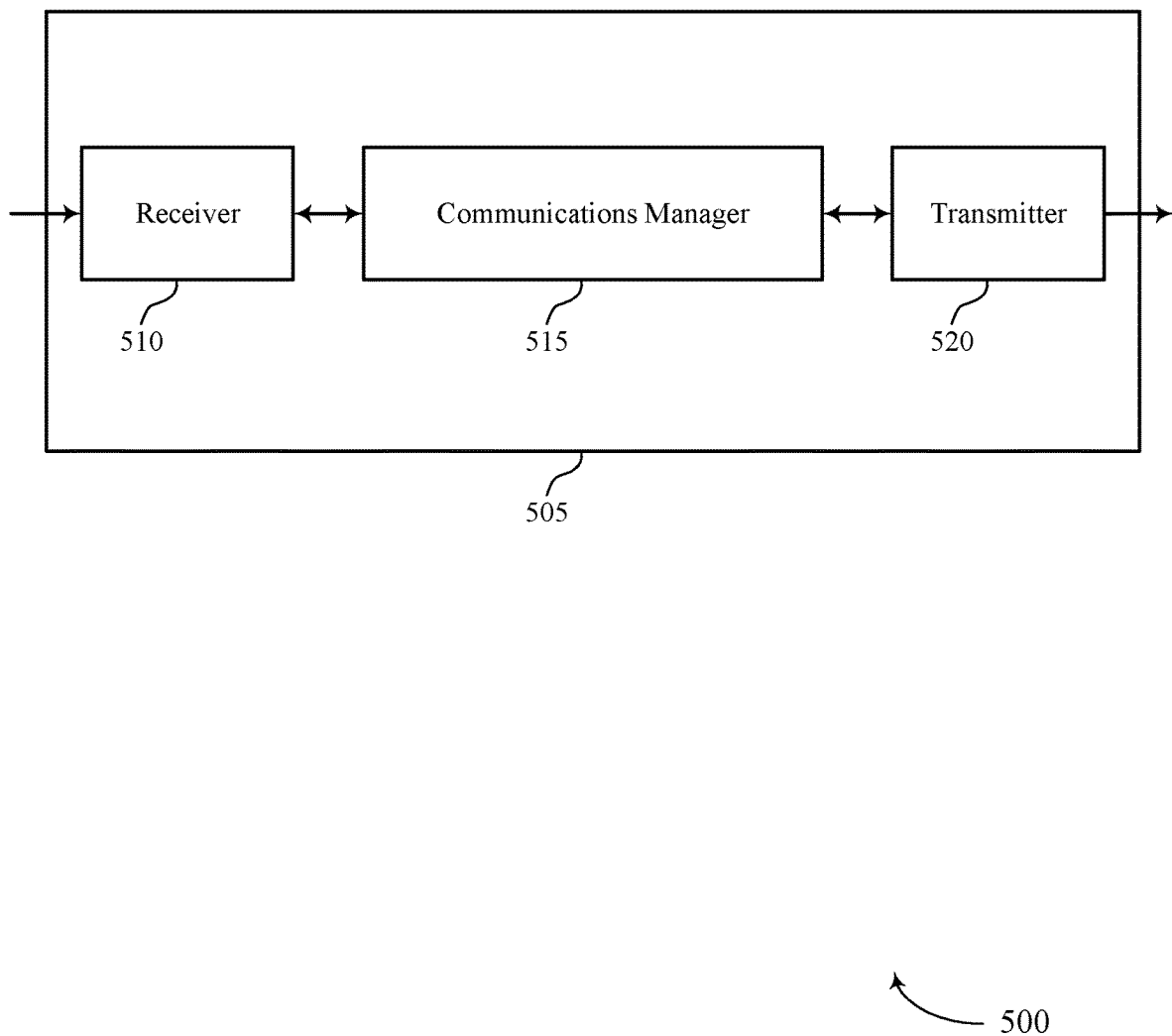
FIGS. 5 and 6 show block diagrams of devices that support multi-root preamble techniques for wireless communications systems in accordance with aspects of the present disclosure.

At 430, the satellite 120-*b* may transmit a preamble response based on the preamble signal. At 430, the UE 115-*b* may receive the preamble response from satellite 120-*b*. At 435, the UE 115-*b* may establish connectivity with satellite 120-*b* based on the preamble response. The satellite 120-*b* may also establish connectivity with the UE 115-*b* based on the preamble response FIG. 5 shows a block diagram 500 of a device 505 that supports multi-root preamble techniques for wireless communications systems in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to multi-root preamble techniques for wireless communications systems, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a configuration message that indicates one or more parameters for a multi-root random access preamble, the one or more parameters including a first sequence root, a second sequence root, and a first cyclic shift corresponding to a first sequence associated with the first sequence root, identify a second cyclic shift corresponding to a second sequence associated with the second sequence root, and transmit the multi-root random access preamble based on the one or more parameters. The communications manager 515 may also receive a configuration message that indicates one or more parameters for a multi-root random access preamble, the one or more parameters including a first sequence root associated with a first sequence, a second sequence root associated with a second sequence, and a first phase rotation corresponding to the first sequence and transmit the multi-root random access preamble based on the one or more parameters. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 515 as described herein may be implemented to realize one or more potential advantages. One implementation may enable a network (e.g., a UE or a base station such as a satellite) to implement multi-root preamble techniques as described herein. For example, a base station may determine and signal one or more parameters (e.g., roots, cyclic shifts, and/or phase rotations) associated with a multi-root preamble (e.g., multiple sequences), for example, transmitted on the same RACH occasion. Such an implementation may enable the network to achieve more efficient communications due to improved resource utilization while ensuring reliable communications due to dynamically utilizing a combination of parameters to reduce the PAPR.

Based on implementing the techniques as described herein, a processor of a wireless device (e.g., a processor controlling the receiver 610, the communications manager 615, and the transmitter 635, etc.) may, in some examples, utilize the parameters described above for transmission of a PRACH preamble, which may result in more efficient communications. For example, the wireless device may use a multi-root preamble to support long-distance communications with a higher chance of success, and the wireless device may reduce resource utilization while maintaining a signal quality (e.g., a PAPR) by implementing the signaled and/or pre-configured parameters associated with the preamble. Therefore, the wireless device may realize increased reliability and efficiency of communications at the processor of the wireless device.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
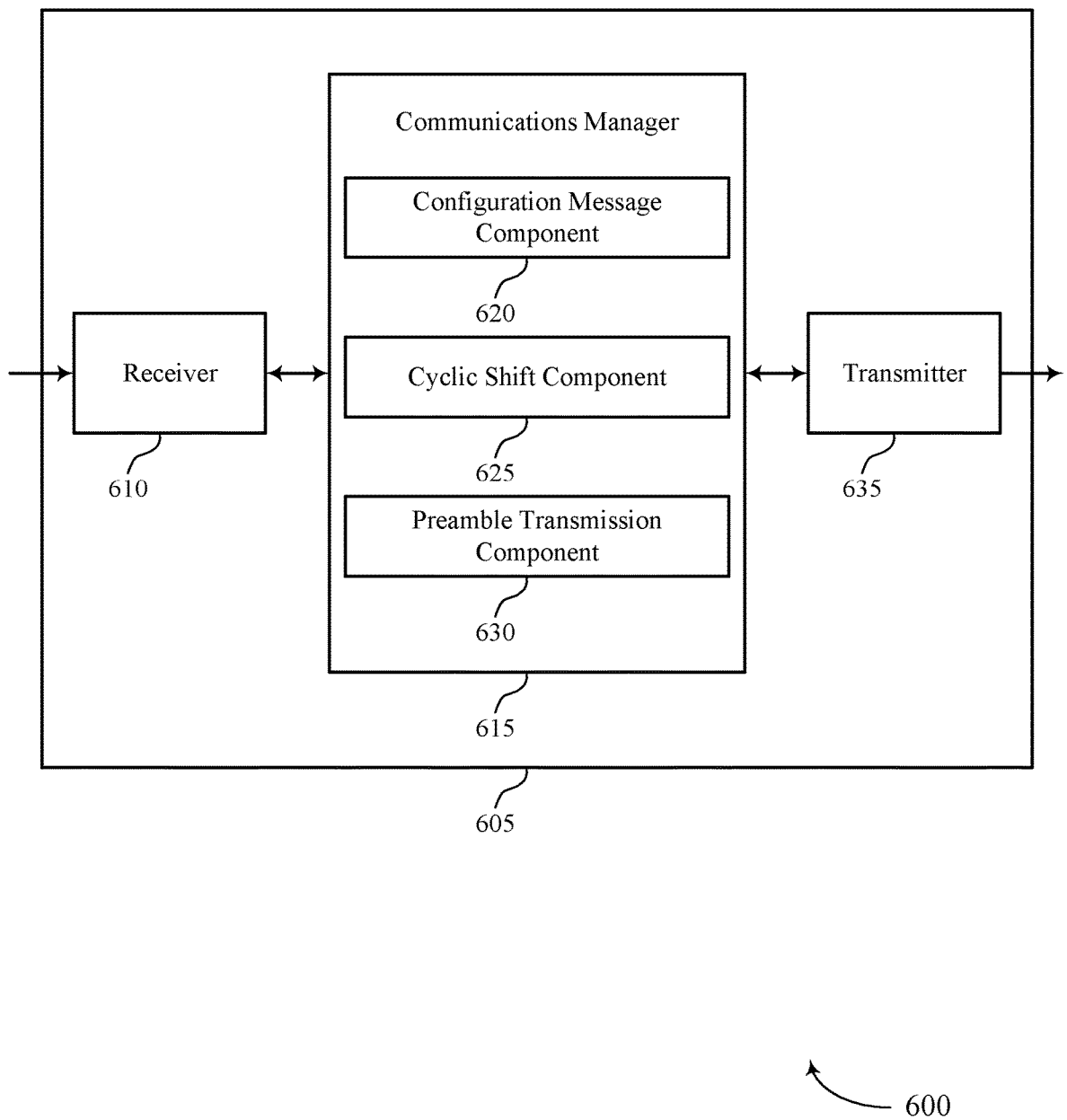

FIG. 6 shows a block diagram 600 of a device 605 that supports multi-root preamble techniques for wireless communications systems in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to multi-root preamble techniques for wireless communications systems, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration message component 620, a cyclic shift component 625, and a preamble transmission component 630. The communications manager 615 may be an example of aspects of the communications manager 810 described herein.

The configuration message component 620 may receive a configuration message that indicates one or more parameters for a multi-root random access preamble, the one or more parameters including a first sequence root, a second sequence root, and a first cyclic shift corresponding to a first sequence associated with the first sequence root. In some examples, the one or more parameters may additionally or alternatively include a first sequence root associated with a first sequence, a second sequence root associated with a second sequence, and a first phase rotation corresponding to the first sequence.

The cyclic shift component 625 may identify a second cyclic shift corresponding to a second sequence associated with the second sequence root.

The preamble transmission component 630 may transmit the multi-root random access preamble based on the one or more parameters.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
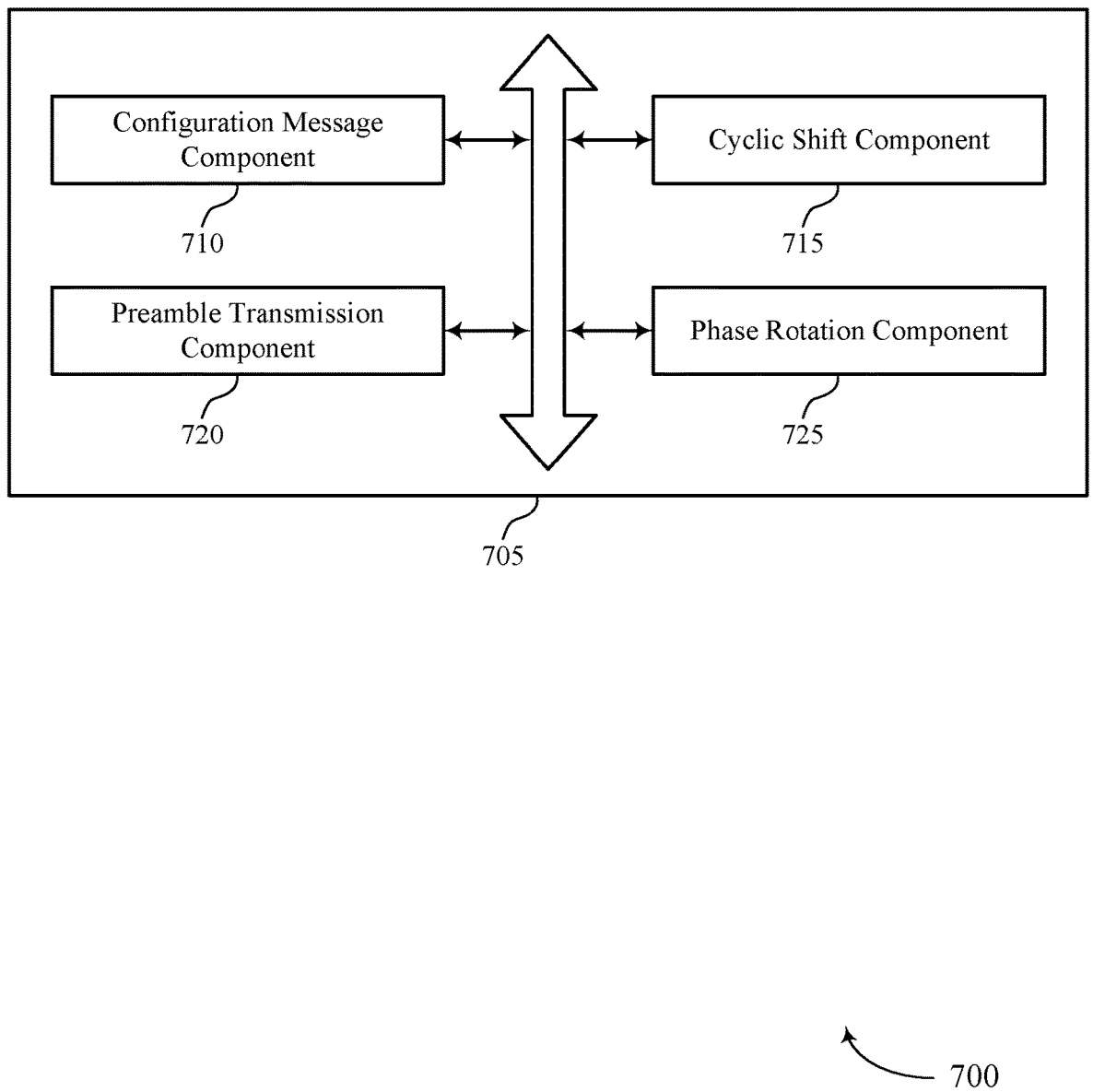
FIG. 7 shows a block diagram of a communications manager that supports multi-root preamble techniques for wireless communications systems in accordance with aspects of the present disclosure.

FIG. 7 shows a block diagram 700 of a communications manager 705 that supports multi-root preamble techniques for wireless communications systems in accordance with aspects of the present disclosure. The communications manager 705 may be an example of aspects of a communications manager 515, a communications manager 615, or a communications manager 810 described herein. The communications manager 705 may include a configuration message component 710, a cyclic shift component 715, a preamble transmission component 720, and a phase rotation component 725. Each of these modules may communicate, directly or indirectly, with one another (e.g., via one or more buses).

The configuration message component 710 may receive a configuration message that indicates one or more parameters for a multi-root random access preamble, the one or more parameters including a first sequence root, a second sequence root, and a first cyclic shift corresponding to a first sequence associated with the first sequence root. In some examples, the one or more parameters may additionally or alternatively including a first sequence root associated with a first sequence, a second sequence root associated with a second sequence, and a first phase rotation corresponding to the first sequence.

The cyclic shift component 715 may identify a second cyclic shift corresponding to a second sequence associated with the second sequence root. In some examples, the cyclic shift component 715 may determine the second cyclic shift based on the configuration message. In some examples, the cyclic shift component 715 may determine the second cyclic shift based on a configuration of the UE, a previous control message, or both. In some cases, the one or more parameters further include a first cyclic shift corresponding to the first sequence, a second cyclic shift corresponding to the second sequence, or both.

The preamble transmission component 720 may transmit the multi-root random access preamble based on the one or more parameters. In some examples, the preamble transmission component 720 may transmit, to a base station, the first sequence in accordance with the one or more parameters and transmitting the second sequence in accordance with the one or more parameters. In some examples, the preamble transmission component 720 may transmit the first sequence and the second sequence on the same random access channel occasion. In some cases, the first sequence and the second sequence are Zadoff-Chu sequences. In some cases, the multi-root random access preamble includes a set of sequences, the set of sequences including the first sequence and the second sequence.

The phase rotation component 725 may determine a second phase rotation corresponding to the second sequence based on the configuration message. In some examples, the phase rotation component 725 may determine a second phase rotation corresponding to the second sequence relative to the first sequence based on a configuration of the UE, a previous control message, or both. In some cases, the one or more parameters further include a first phase rotation corresponding to the first sequence, a second phase rotation corresponding to the second sequence, or both.

Figure 8:
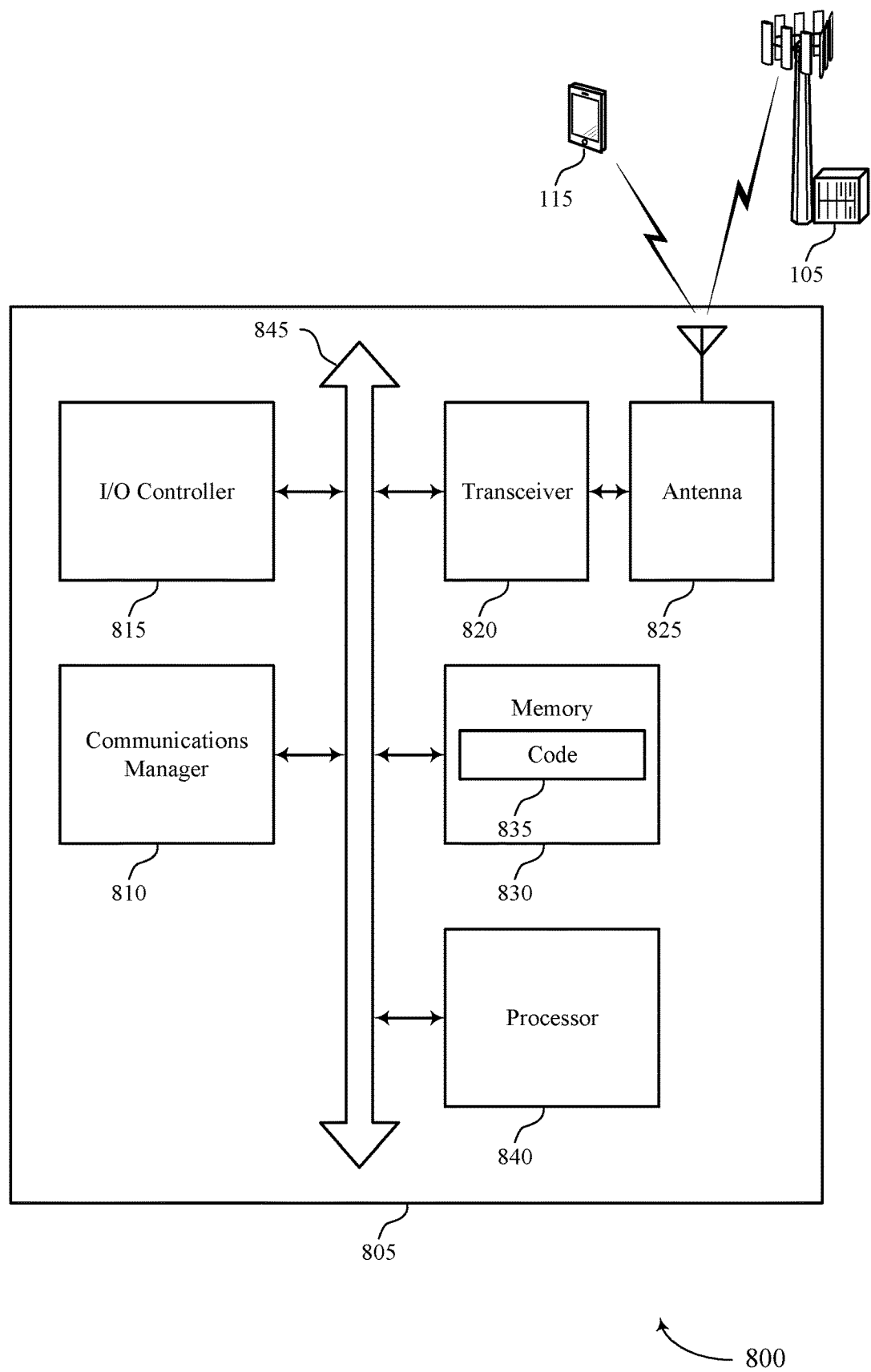
FIG. 8 shows a diagram of a system including a device that supports multi-root preamble techniques for wireless communications systems in accordance with aspects of the present disclosure.

FIG. 8 shows a diagram of a system 800 including a device 805 that supports multi-root preamble techniques for wireless communications systems in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a configuration message that indicates one or more parameters for a multi-root random access preamble, the one or more parameters including a first sequence root, a second sequence root, and a first cyclic shift corresponding to a first sequence associated with the first sequence root, identify a second cyclic shift corresponding to a second sequence associated with the second sequence root, and transmit the multi-root random access preamble based on the one or more parameters. The communications manager 810 may also receive a configuration message that indicates one or more parameters for a multi-root random access preamble, the one or more parameters including a first sequence root associated with a first sequence, a second sequence root associated with a second sequence, and a first phase rotation corresponding to the first sequence and transmit the multi-root random access preamble based on the one or more parameters.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting multi-root preamble techniques for wireless communications systems).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
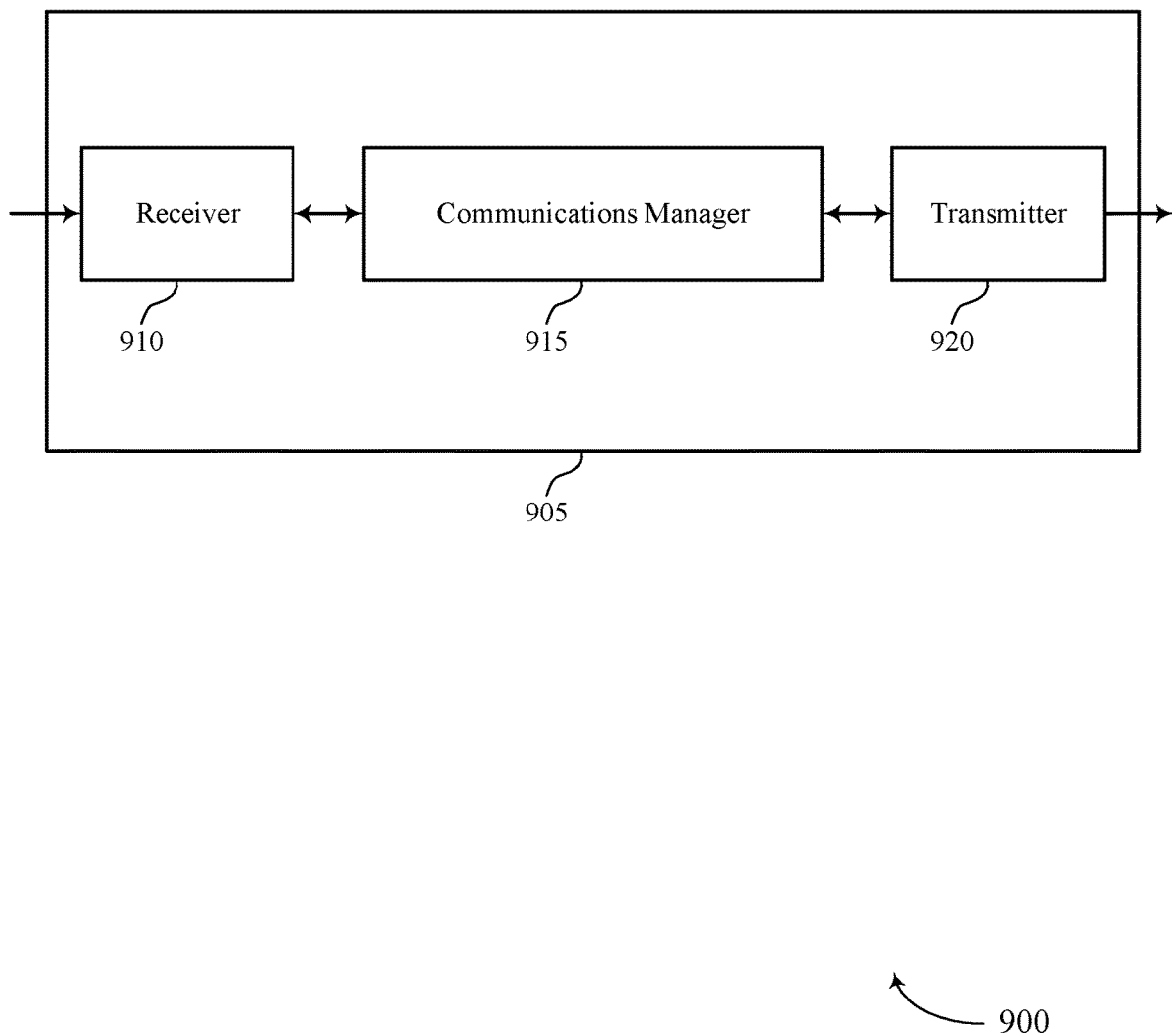
FIGS. 9 and 10 show block diagrams of devices that support multi-root preamble techniques for wireless communications systems in accordance with aspects of the present disclosure.

FIG. 9 shows a block diagram 900 of a device 905 that supports multi-root preamble techniques for wireless communications systems in accordance with aspects of the present disclosure. The device 905 may be an example of aspects of a base station 105 as described herein (e.g., a base station 105 and/or a satellite 120, among other examples of devices). The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to multi-root preamble techniques for wireless communications systems, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify, for a multi-root random access preamble, a first sequence root, a second sequence root, a first cyclic shift corresponding to a first sequence associated with the first sequence root, and a second cyclic shift corresponding to a second sequence associated with the second sequence root, transmit a configuration message that indicates one or more parameters for the multi-root random access preamble, the one or more parameters including the first sequence root, the second sequence root, and the first cyclic shift, and receive the multi-root random access preamble based on the one or more preamble parameters. The communications manager 915 may also identify, for a multi-root random access preamble, a first sequence root associated with a first sequence, a second sequence root associated with a second sequence, and a first phase rotation corresponding to the first sequence, transmit a configuration message that indicates one or more parameters for the multi-root random access preamble, the one or more parameters including the first sequence root, the second sequence root, and the first phase rotation, and receive the multi-root random access preamble based on the one or more preamble parameters. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
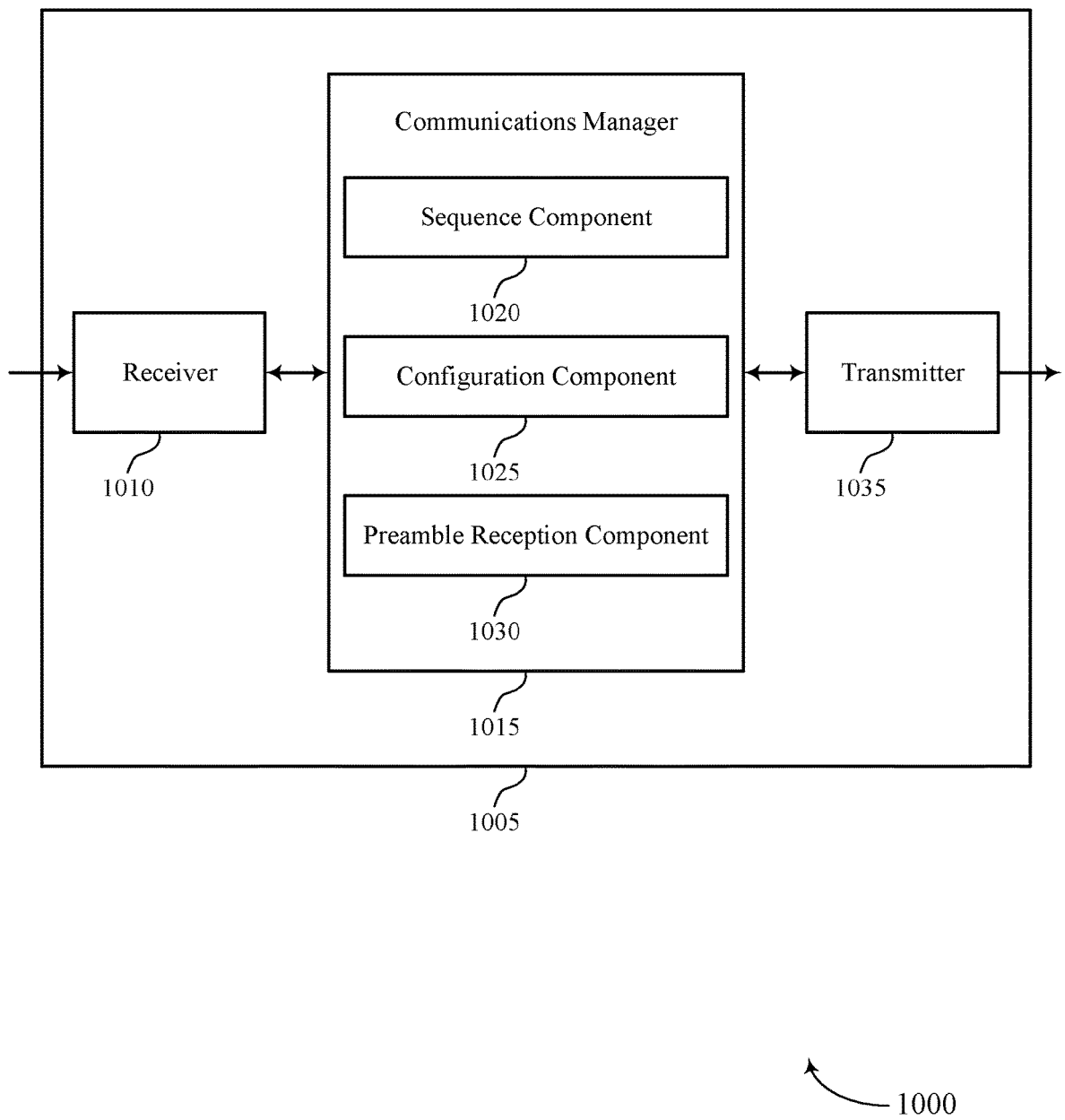

FIG. 10 shows a block diagram 1000 of a device 1005 that supports multi-root preamble techniques for wireless communications systems in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to multi-root preamble techniques for wireless communications systems, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a sequence component 1020, a configuration component 1025, and a preamble reception component 1030. The communications manager 1015 may be an example of aspects of the communications manager 1210 described herein.

The sequence component 1020 may identify, for a multi-root random access preamble, a first sequence root, a second sequence root, a first cyclic shift corresponding to a first sequence associated with the first sequence root, and a second cyclic shift corresponding to a second sequence associated with the second sequence root. In some examples, the sequence component 1020 may additionally or alternatively identify, for a multi-root random access preamble, a first sequence root associated with a first sequence, a second sequence root associated with a second sequence, and a first phase rotation corresponding to the first sequence.

The configuration component 1025 may transmit a configuration message that indicates one or more parameters for the multi-root random access preamble, the one or more parameters including the first sequence root, the second sequence root, and the first cyclic shift. In some examples, the configuration component 1025 may additionally or alternatively transmit a configuration message that indicates one or more parameters for the multi-root random access preamble, the one or more parameters including the first sequence root, the second sequence root, and the first phase rotation.

The preamble reception component 1030 may receive the multi-root random access preamble based on the one or more preamble parameters.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
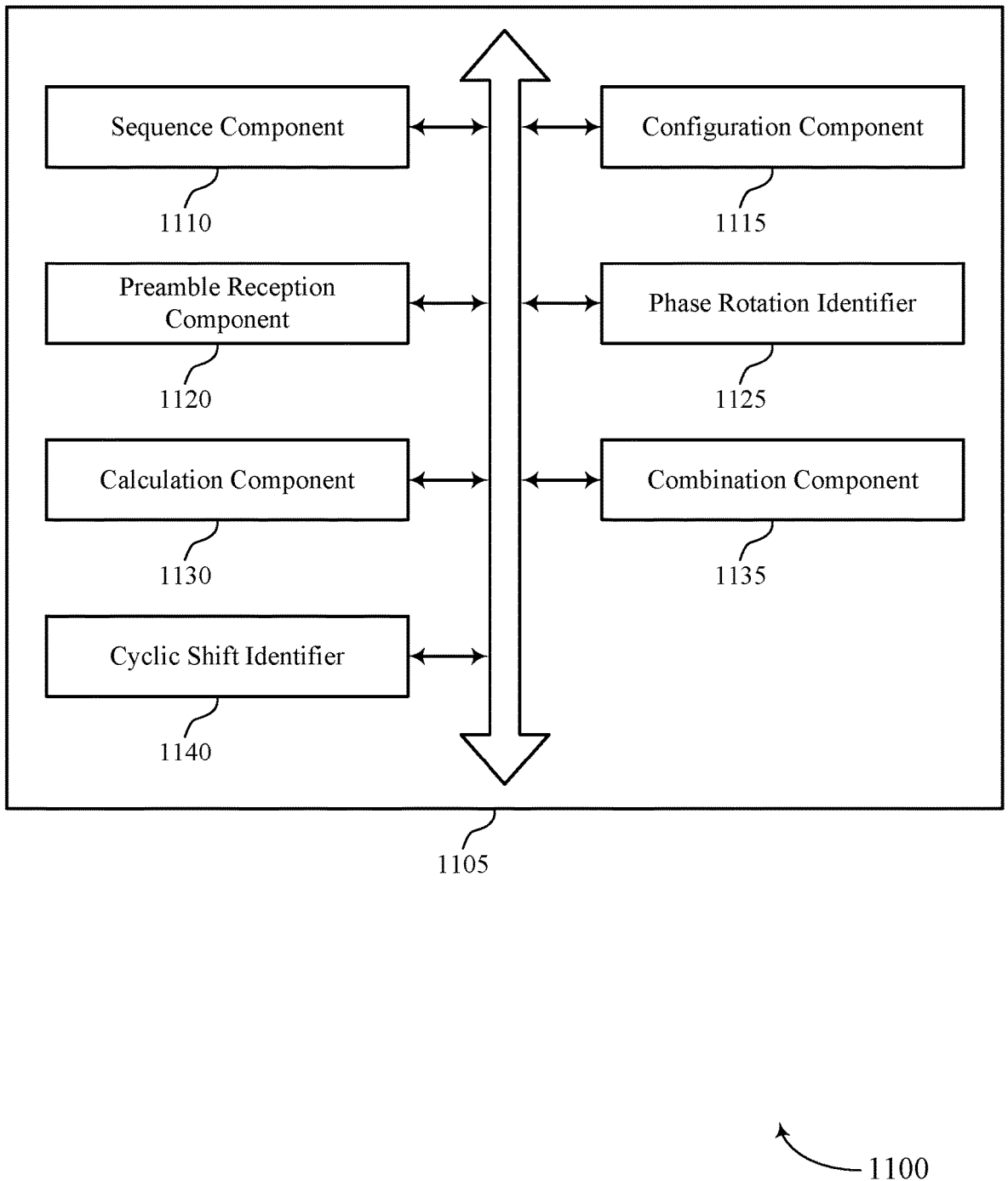
FIG. 11 shows a block diagram of a communications manager that supports multi-root preamble techniques for wireless communications systems in accordance with aspects of the present disclosure.

FIG. 11 shows a block diagram 1100 of a communications manager 1105 that supports multi-root preamble techniques for wireless communications systems in accordance with aspects of the present disclosure. The communications manager 1105 may be an example of aspects of a communications manager 915, a communications manager 1015, or a communications manager 1210 described herein. The communications manager 1105 may include a sequence component 1110, a configuration component 1115, a preamble reception component 1120, a phase rotation identifier 1125, a calculation component 1130, a combination component 1135, and a cyclic shift identifier 1140. Each of these modules may communicate, directly or indirectly, with one another (e.g., via one or more buses).

The sequence component 1110 may identify, for a multi-root random access preamble, a first sequence root, a second sequence root, a first cyclic shift corresponding to a first sequence associated with the first sequence root, and a second cyclic shift corresponding to a second sequence associated with the second sequence root. In some examples, the sequence component 1110 may additionally or alternatively identify, for a multi-root random access preamble, a first sequence root associated with a first sequence, a second sequence root associated with a second sequence, and a first phase rotation corresponding to the first sequence.

The configuration component 1115 may transmit a configuration message that indicates one or more parameters for the multi-root random access preamble, the one or more parameters including the first sequence root, the second sequence root, and the first cyclic shift. In some examples, the configuration component 1115 may additionally or alternatively transmit a configuration message that indicates one or more parameters for the multi-root random access preamble, the one or more parameters including the first sequence root, the second sequence root, and the first phase rotation. In some cases, the configuration message indicates the second cyclic shift.

The preamble reception component 1120 may receive the multi-root random access preamble based on the one or more preamble parameters. In some examples, the preamble reception component 1120 may receive, from a UE, the first sequence based on the one or more parameters and receiving the second sequence based on the one or more parameters. In some examples, the preamble reception component 1120 may receive the first sequence and the second sequence on the same random access channel occasion. In some cases, the base station is a terrestrial base station or a non-terrestrial base station, the non-terrestrial base station including a satellite or a high altitude platform station in a non-terrestrial network. In some cases, the first sequence and the second sequence are Zadoff-Chu sequences. In some cases, the multi-root random access preamble includes a set of sequences, the set of sequences including the first sequence and the second sequence.

The phase rotation identifier 1125 may identify, for the multi-root random access preamble, a first phase rotation corresponding to the first sequence and a second phase rotation corresponding to the second sequence, where the configuration message indicates the first phase rotation, the second phase rotation, or both. In some examples, the phase rotation identifier 1125 may identify a second phase rotation corresponding to the second sequence.

The calculation component 1130 may calculate a PAPR for a set of combinations of sequence roots and cyclic shifts, where the set of combinations includes at least a first combination of the first sequence root, the second sequence root, the first cyclic shift, and the second cyclic shift. In some examples, the calculation component 1130 may calculate a PAPR for a set of combinations of sequence roots and phase rotations, where the set of combinations includes at least a first combination of the first sequence root, the second sequence root, the first phase rotation, and a second phase rotation corresponding to the second sequence.

The combination component 1135 may determine the first combination for the multi-root random access preamble based on the first combination having a minimum PAPR from the set of combinations.

The cyclic shift identifier 1140 may identify, for the multi-root random access preamble, a first cyclic shift corresponding to the first sequence, a second cyclic shift corresponding to the second sequence, or both, where the configuration message indicates the first cyclic shift, the second cyclic shift, or both.

Figure 12:
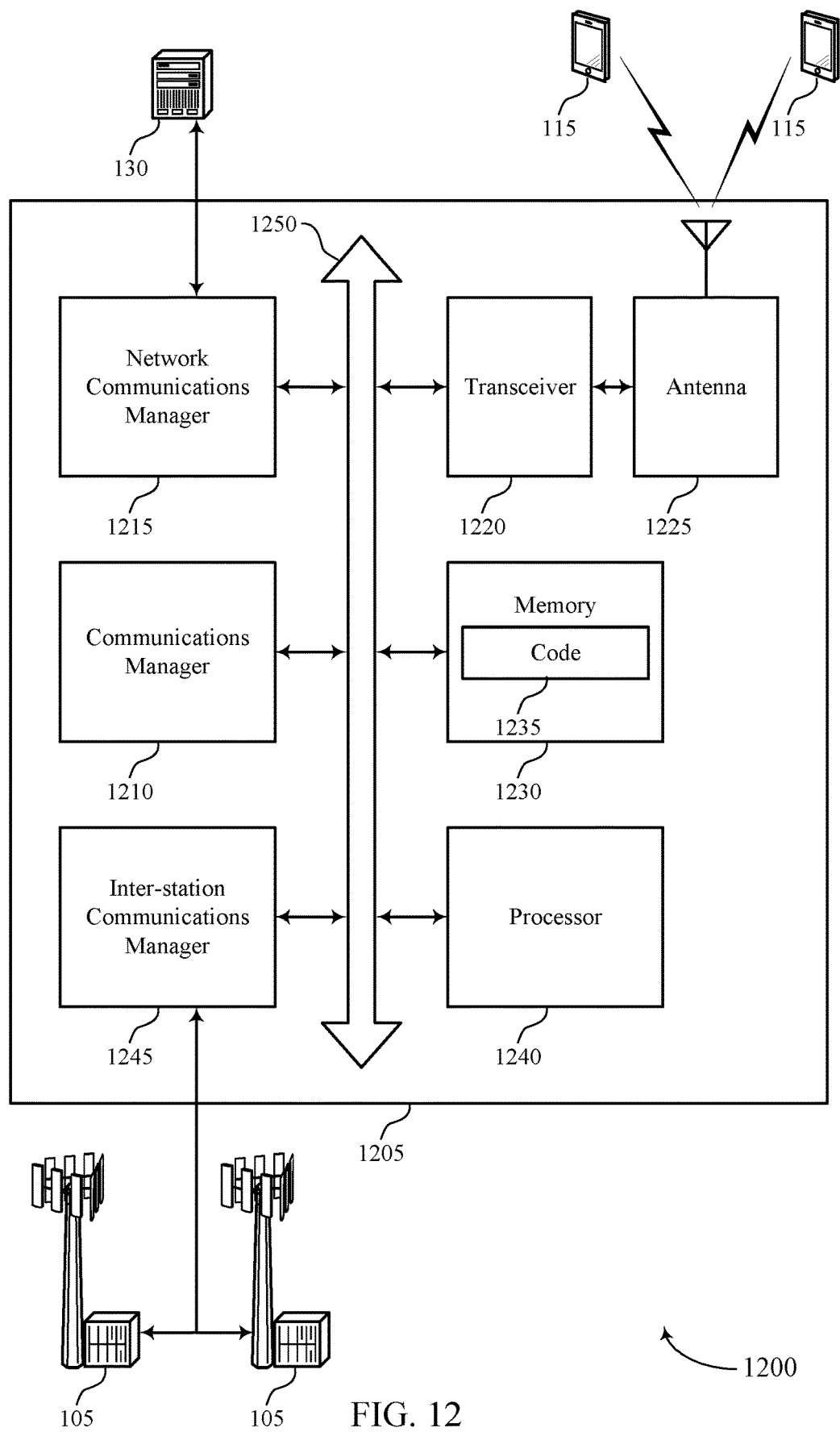
FIG. 12 shows a diagram of a system including a device that supports multi-root preamble techniques for wireless communications systems in accordance with aspects of the present disclosure.

FIG. 12 shows a diagram of a system 1200 including a device 1205 that supports multi-root preamble techniques for wireless communications systems in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify, for a multi-root random access preamble, a first sequence root, a second sequence root, a first cyclic shift corresponding to a first sequence associated with the first sequence root, and a second cyclic shift corresponding to a second sequence associated with the second sequence root, transmit a configuration message that indicates one or more parameters for the multi-root random access preamble, the one or more parameters including the first sequence root, the second sequence root, and the first cyclic shift, and receive the multi-root random access preamble based on the one or more preamble parameters. The communications manager 1210 may also identify, for a multi-root random access preamble, a first sequence root associated with a first sequence, a second sequence root associated with a second sequence, and a first phase rotation corresponding to the first sequence, transmit a configuration message that indicates one or more parameters for the multi-root random access preamble, the one or more parameters including the first sequence root, the second sequence root, and the first phase rotation, and receive the multi-root random access preamble based on the one or more preamble parameters.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting multi-root preamble techniques for wireless communications systems).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
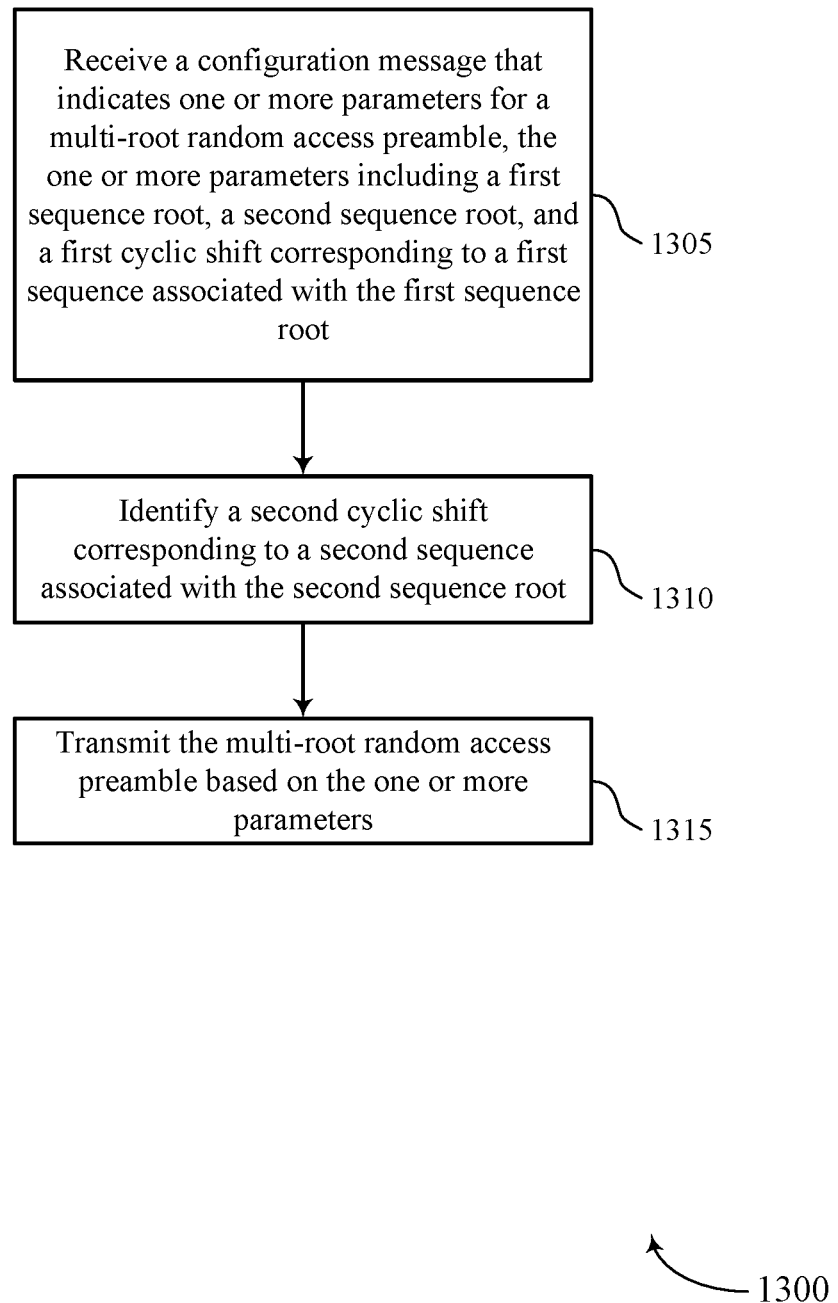
FIGS. 13 through 16 show flowcharts illustrating methods that support multi-root preamble techniques for wireless communications systems in accordance with aspects of the present disclosure.

FIG. 13 shows a flowchart illustrating a method 1300 that supports multi-root preamble techniques for wireless communications systems in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a configuration message that indicates one or more parameters for a multi-root random access preamble, the one or more parameters including a first sequence root, a second sequence root, and a first cyclic shift corresponding to a first sequence associated with the first sequence root. The operations of 1305 may be performed according to the methods described herein. In some examples, aspects of the operations of 1305 may be performed by a configuration message component as described with reference to FIGS. 5 through 8.

At 1310, the UE may identify a second cyclic shift corresponding to a second sequence associated with the second sequence root. The operations of 1310 may be performed according to the methods described herein. In some examples, aspects of the operations of 1310 may be performed by a cyclic shift component as described with reference to FIGS. 5 through 8.

At 1315, the UE may transmit the multi-root random access preamble based on the one or more parameters. The operations of 1315 may be performed according to the methods described herein. In some examples, aspects of the operations of 1315 may be performed by a preamble transmission component as described with reference to FIGS. 5 through 8.

Figure 14:
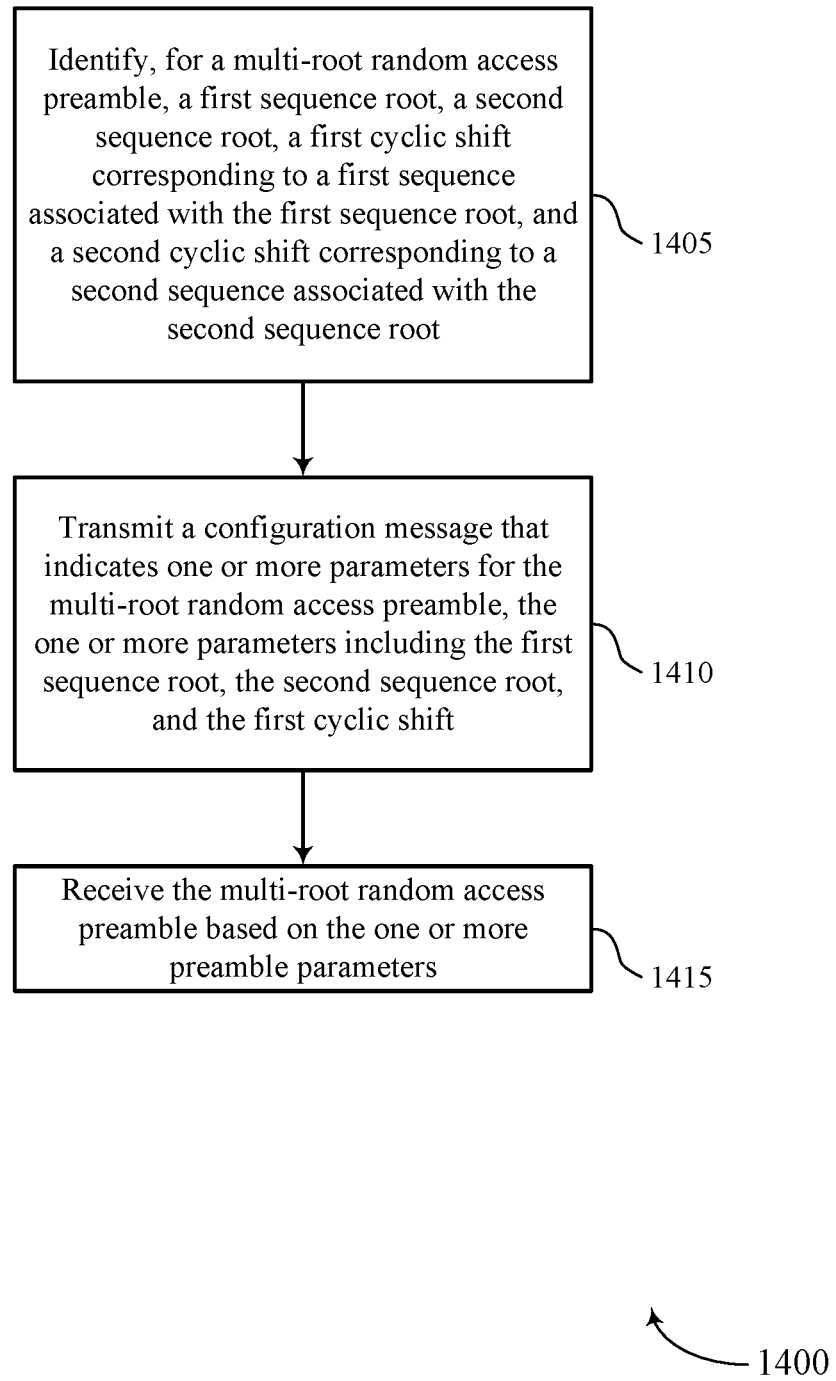

FIG. 14 shows a flowchart illustrating a method 1400 that supports multi-root preamble techniques for wireless communications systems in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may identify, for a multi-root random access preamble, a first sequence root, a second sequence root, a first cyclic shift corresponding to a first sequence associated with the first sequence root, and a second cyclic shift corresponding to a second sequence associated with the second sequence root. The operations of 1405 may be performed according to the methods described herein. In some examples, aspects of the operations of 1405 may be performed by a sequence component as described with reference to FIGS. 9 through 12.

At 1410, the base station may transmit a configuration message that indicates one or more parameters for the multi-root random access preamble, the one or more parameters including the first sequence root, the second sequence root, and the first cyclic shift. The operations of 1410 may be performed according to the methods described herein. In some examples, aspects of the operations of 1410 may be performed by a configuration component as described with reference to FIGS. 9 through 12.

At 1415, the base station may receive the multi-root random access preamble based on the one or more preamble parameters. The operations of 1415 may be performed according to the methods described herein. In some examples, aspects of the operations of 1415 may be performed by a preamble reception component as described with reference to FIGS. 9 through 12.

Figure 15:
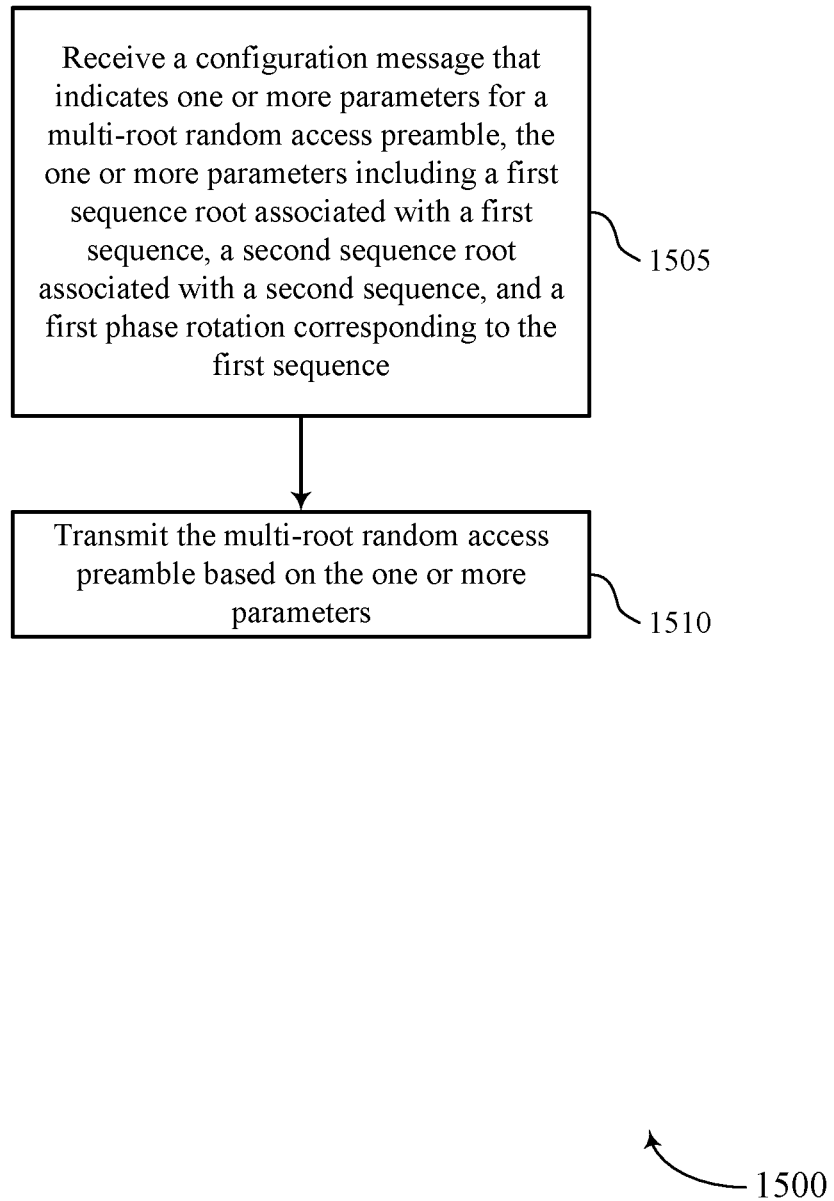

FIG. 15 shows a flowchart illustrating a method 1500 that supports multi-root preamble techniques for wireless communications systems in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a configuration message that indicates one or more parameters for a multi-root random access preamble, the one or more parameters including a first sequence root associated with a first sequence, a second sequence root associated with a second sequence, and a first phase rotation corresponding to the first sequence. The operations of 1505 may be performed according to the methods described herein. In some examples, aspects of the operations of 1505 may be performed by a configuration message component as described with reference to FIGS. 5 through 8.

At 1510, the UE may transmit the multi-root random access preamble based on the one or more parameters. The operations of 1510 may be performed according to the methods described herein. In some examples, aspects of the operations of 1510 may be performed by a preamble transmission component as described with reference to FIGS. 5 through 8.

Figure 16:
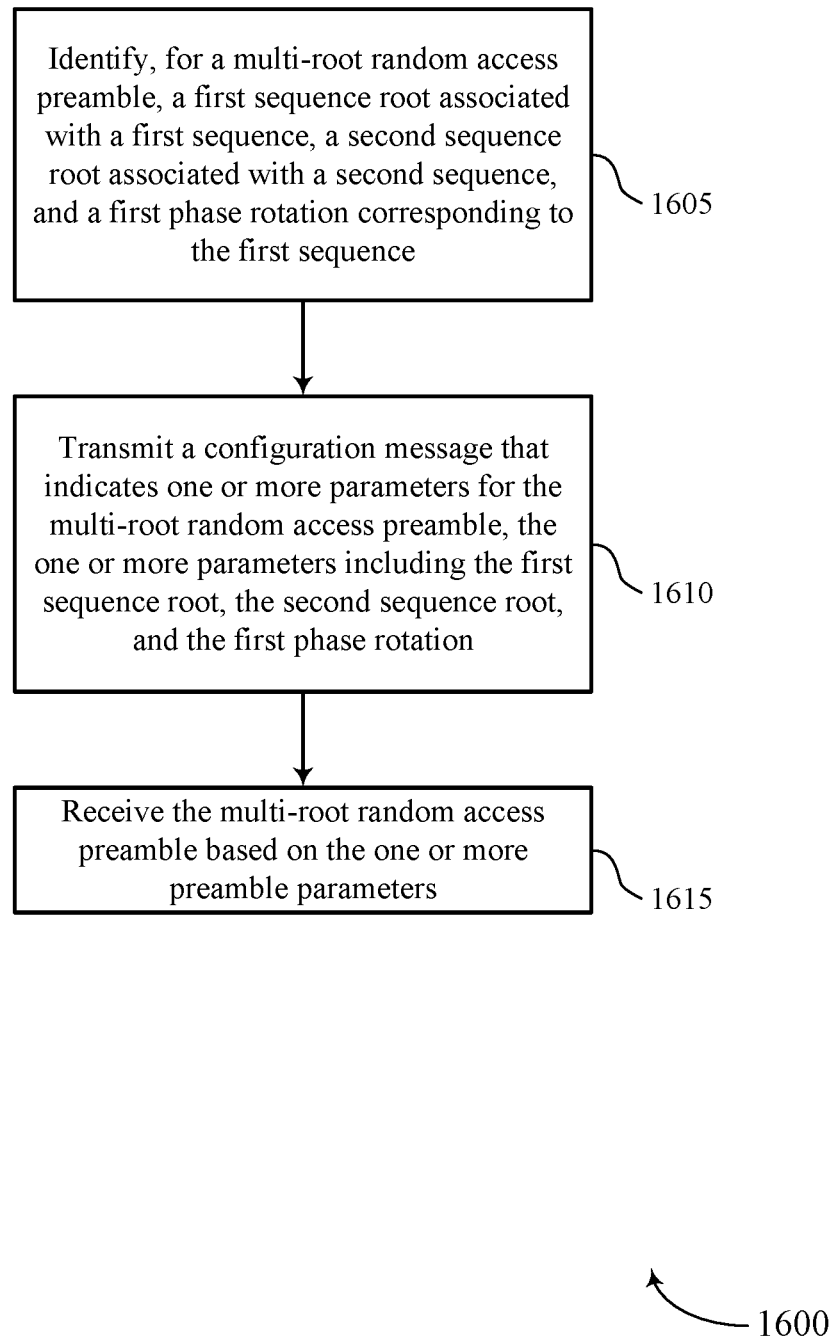

FIG. 16 shows a flowchart illustrating a method 1600 that supports multi-root preamble techniques for wireless communications systems in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may identify, for a multi-root random access preamble, a first sequence root associated with a first sequence, a second sequence root associated with a second sequence, and a first phase rotation corresponding to the first sequence. The operations of 1605 may be performed according to the methods described herein. In some examples, aspects of the operations of 1605 may be performed by a sequence component as described with reference to FIGS. 9 through 12.

At 1610, the base station may transmit a configuration message that indicates one or more parameters for the multi-root random access preamble, the one or more parameters including the first sequence root, the second sequence root, and the first phase rotation. The operations of 1610 may be performed according to the methods described herein. In some examples, aspects of the operations of 1610 may be performed by a configuration component as described with reference to FIGS. 9 through 12.

At 1615, the base station may receive the multi-root random access preamble based on the one or more preamble parameters. The operations of 1615 may be performed according to the methods described herein. In some examples, aspects of the operations of 1615 may be performed by a preamble reception component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a configuration message that indicates one or more parameters for transmitting a multi-root random access preamble, the one or more parameters from the configuration message comprising a first sequence root, a second sequence root, and a first cyclic shift corresponding to a first sequence associated with the first sequence root, wherein the first sequence root, the second sequence root, and the first cyclic shift are based at least in part on a calculation performed at a device different than the UE;
   identifying a second cyclic shift corresponding to a second sequence associated with the second sequence root from the configuration message; and
   transmitting the multi-root random access preamble based at least in part on the one or more parameters, the multi-root random access preamble comprising the first sequence associated with the first sequence root and the second sequence associated with the second sequence root.

2. The method of claim 1, wherein identifying the second cyclic shift further comprises:
 determining the second cyclic shift based at least in part on the configuration message.

3. The method of claim 1, wherein identifying the second cyclic shift further comprises:
 determining the second cyclic shift based at least in part on a configuration of the UE, a previous control message, or both.

4. The method of claim 1, wherein the one or more parameters further comprise a first phase rotation corresponding to the first sequence, a second phase rotation corresponding to the second sequence, or both.

5. The method of claim 1, wherein transmitting the multi-root random access preamble comprises:
 transmitting, to a network device, the first sequence in accordance with the one or more parameters and transmitting the second sequence in accordance with the one or more parameters.

6. The method of claim 1, wherein the first sequence and the second sequence are Zadoff-Chu sequences.

7. The method of claim 1, wherein transmitting the multi-root random access preamble comprises:
 transmitting the first sequence and the second sequence on a same random access channel occasion.

8. The method of claim 1, wherein the multi-root random access preamble comprises a plurality of sequences, the plurality of sequences comprising the first sequence and the second sequence.

9. A method for wireless communications at a network device, comprising:
 identifying, for a multi-root random access preamble, a first sequence root, a second sequence root, a first cyclic shift corresponding to a first sequence associated with the first sequence root, and a second cyclic shift corresponding to a second sequence associated with the second sequence root, wherein the first sequence root, the second sequence root, the first cyclic shift, and the second cyclic shift are based at least in part on a calculation performed at the network device;
 transmitting a configuration message that indicates one or more parameters for a transmission of the multi-root random access preamble, the one or more parameters from the configuration message comprising the first sequence root, the second sequence root, and the first cyclic shift; and
 receiving the multi-root random access preamble based at least in part on the one or more parameters, the multi-root random access preamble comprising the first sequence associated with the first sequence root and the second sequence associated with the second sequence root.

10. A method for wireless communications at a user equipment (UE), comprising:
 receiving a configuration message that indicates one or more parameters for transmitting a multi-root random access preamble, the one or more parameters from the configuration message comprising a first sequence root associated with a first sequence, a second sequence root associated with a second sequence, and a first phase rotation corresponding to the first sequence, wherein the first sequence root, the second sequence root, and the first phase rotation are based at least in part on a calculation performed at a device different than the UE; and
 transmitting the multi-root random access preamble based at least in part on the one or more parameters, the multi-root random access preamble comprising the first sequence associated with the first sequence root and the second sequence associated with the second sequence root.

11. The method of claim 10, further comprising:
 determining a second phase rotation corresponding to the second sequence based at least in part on the configuration message.

12. The method of claim 10, further comprising:
 determining a second phase rotation corresponding to the second sequence relative to the first sequence based at least in part on a configuration of the UE, a previous control message, or both.

13. The method of claim 10, wherein the one or more parameters further comprise a first cyclic shift corresponding to the first sequence, a second cyclic shift corresponding to the second sequence, or both.

14. The method of claim 10, wherein transmitting the multi-root random access preamble comprises:
 transmitting, to a network device, the first sequence in accordance with the one or more parameters and transmitting the second sequence in accordance with the one or more parameters.

15. The method of claim 10, wherein the first sequence and the second sequence are Zadoff-Chu sequences.

16. The method of claim 10, wherein transmitting the multi-root random access preamble comprises:
 transmitting the first sequence and the second sequence on a same random access channel occasion.

17. The method of claim 10, wherein the multi-root random access preamble comprises a plurality of sequences, the plurality of sequences comprising the first sequence and the second sequence.

18. A method for wireless communications at a network device, comprising:
 identifying, for a multi-root random access preamble, a first sequence root associated with a first sequence, a second sequence root associated with a second sequence, and a first phase rotation corresponding to the first sequence, wherein the first sequence root, the second sequence root, and the first phase rotation are based at least in part on a calculation performed at the network device;
 transmitting a configuration message that indicates one or more parameters for a transmission of the multi-root random access preamble, the one or more parameters from the configuration message comprising the first sequence root, the second sequence root, and the first phase rotation; and
 receiving the multi-root random access preamble based at least in part on the one or more parameters, the multi-root random access preamble comprising the first sequence associated with the first sequence root and the second sequence associated with the second sequence root.

19. An apparatus for wireless communications at a user equipment (UE), comprising:
 a processor,
 memory coupled with the processor; and
 instructions stored in the memory and executable by the processor to cause the apparatus to:
  receive a configuration message that indicates one or more parameters for transmitting a multi-root random access preamble, the one or more parameters from the configuration message comprising a first sequence root, a second sequence root, and a first cyclic shift corresponding to a first sequence associated with the first sequence root, wherein the first sequence root, the second sequence root, and the first cyclic shift are based at least in part on a calculation performed at a device different than the UE;
identify a second cyclic shift corresponding to a second sequence associated with the second sequence root from the configuration message; and
transmit the multi-root random access preamble based at least in part on the one or more parameters, the multi-root random access preamble comprising the first sequence associated with the first sequence root and the second sequence associated with the second sequence root.

20. The apparatus of claim 19, wherein the instructions to identify the second cyclic shift further are executable by the processor to cause the apparatus to:
determine the second cyclic shift based at least in part on the configuration message.

21. The apparatus of claim 19, wherein the instructions to identify the second cyclic shift further are executable by the processor to cause the apparatus to:
determine the second cyclic shift based at least in part on a configuration of the UE, a previous control message, or both.

22. The apparatus of claim 19, wherein the one or more parameters further comprise a first phase rotation corresponding to the first sequence, a second phase rotation corresponding to the second sequence, or both.

23. The apparatus of claim 19, wherein the instructions to transmit the multi-root random access preamble are executable by the processor to cause the apparatus to:
transmit, to a network device, the first sequence in accordance with the one or more parameters and transmitting the second sequence in accordance with the one or more parameters.

24. The apparatus of claim 19, wherein the first sequence and the second sequence are Zadoff-Chu sequences.

25. The apparatus of claim 19, wherein the instructions to transmit the multi-root random access preamble are executable by the processor to cause the apparatus to:
transmit the first sequence and the second sequence on a same random access channel occasion.

26. The apparatus of claim 19, wherein the multi-root random access preamble comprises a plurality of sequences, the plurality of sequences comprising the first sequence and the second sequence.

27. An apparatus for wireless communications at a user equipment (UE), comprising:
a processor,
memory coupled with the processor; and
instructions stored in the memory and executable by the processor to cause the apparatus to:
receive a configuration message that indicates one or more parameters for transmitting a multi-root random access preamble, the one or more parameters from the configuration message comprising a first sequence root associated with a first sequence, a second sequence root associated with a second sequence, and a first phase rotation corresponding to the first sequence, wherein the first sequence root, the second sequence root, and the first phase rotation are based at least in part on a calculation performed at a device different than the UE; and
transmit the multi-root random access preamble based at least in part on the one or more parameters, the multi-root random access preamble comprising the first sequence associated with the first sequence root and the second sequence associated with the second sequence root.

28. The apparatus of claim 27, wherein the instructions are further executable by the processor to cause the apparatus to:
determine a second phase rotation corresponding to the second sequence based at least in part on the configuration message.

29. The apparatus of claim 27, wherein the instructions are further executable by the processor to cause the apparatus to:
determine a second phase rotation corresponding to the second sequence relative to the first sequence based at least in part on a configuration of the UE, a previous control message, or both.

30. The apparatus of claim 27, wherein the one or more parameters further comprise a first cyclic shift corresponding to the first sequence, a second cyclic shift corresponding to the second sequence, or both.

31. The apparatus of claim 27, wherein the instructions to transmit the multi-root random access preamble are executable by the processor to cause the apparatus to:
transmit, to a network device, the first sequence in accordance with the one or more parameters and transmitting the second sequence in accordance with the one or more parameters.

32. The apparatus of claim 27, wherein the first sequence and the second sequence are Zadoff-Chu sequences.

33. The apparatus of claim 27, wherein the instructions to transmit the multi-root random access preamble are executable by the processor to cause the apparatus to:
transmit the first sequence and the second sequence on a same random access channel occasion.

34. The apparatus of claim 27, wherein the multi-root random access preamble comprises a plurality of sequences, the plurality of sequences comprising the first sequence and the second sequence.

* * * * *